(12) United States Patent
Naruse et al.

(10) Patent No.: US 8,348,305 B2
(45) Date of Patent: Jan. 8, 2013

(54) AIRBAG

(75) Inventors: Motoaki Naruse, Aichi-ken (JP);
Hiroyuki Kobayashi, Aichi-ken (JP);
Masamichi Kajiro, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 478 days.

(21) Appl. No.: 12/585,765

(22) Filed: Sep. 24, 2009

(65) Prior Publication Data
US 2010/0078919 A1    Apr. 1, 2010

(30) Foreign Application Priority Data

Sep. 30, 2008 (JP) .................. 2008-252769
Jun. 24, 2009 (JP) .................. 2009-150258

(51) Int. Cl.
*B60R 21/207* (2006.01)
*B60R 21/231* (2011.01)

(52) U.S. Cl. .................. 280/743.1; 280/730.2
(58) Field of Classification Search .................. None
See application file for complete search history.

(56) References Cited

U.S. PATENT DOCUMENTS

| | | | | |
|---|---|---|---|---|
| 5,104,727 A * | 4/1992 | Wnenchak | .................. | 442/268 |
| 5,110,666 A * | 5/1992 | Menzel et al. | .................. | 428/196 |
| 5,114,180 A * | 5/1992 | Kami et al. | .................. | 280/743.1 |
| 5,240,283 A * | 8/1993 | Kishi et al. | .................. | 280/729 |
| 5,378,011 A * | 1/1995 | Rogerson et al. | .................. | 280/728.1 |
| 5,452,914 A * | 9/1995 | Hirai | .................. | 280/743.1 |
| 5,492,362 A * | 2/1996 | Lehman et al. | .................. | 280/739 |
| 5,538,280 A * | 7/1996 | Gray et al. | .................. | 280/743.1 |
| 5,607,183 A * | 3/1997 | Nishimura et al. | .................. | 280/743.2 |
| 5,707,711 A * | 1/1998 | Kitamura | .................. | 428/193 |
| 5,906,879 A * | 5/1999 | Huntoon et al. | .................. | 428/136 |
| 5,909,895 A * | 6/1999 | Iino et al. | .................. | 280/743.1 |
| 6,113,141 A * | 9/2000 | Baker | .................. | 280/743.2 |
| 6,142,520 A * | 11/2000 | Iino et al. | .................. | 280/743.1 |
| 6,220,629 B1 * | 4/2001 | Wipasuramonton et al. | .................. | 280/743.1 |
| 6,239,046 B1 * | 5/2001 | Veiga et al. | .................. | 442/76 |

(Continued)

FOREIGN PATENT DOCUMENTS

JP    A-H02-162134    6/1990

(Continued)

OTHER PUBLICATIONS

Office Action dated Jun. 20, 2012 in corresponding JP Application No. 2009-150258.

*Primary Examiner* — Paul N Dickson
*Assistant Examiner* — Nicole Verley
(74) *Attorney, Agent, or Firm* — Posz Law Group, PLC

(57) ABSTRACT

An airbag includes a body cloth made of polyamide woven fabric and constituting a circumferential wall of the airbag. The body cloth includes on the inner surface a bond area having a coating layer of polyamide elastomer and to which a supplementary cloth made of polyamide woven fabric is bonded, an extended area having a same coating layer of polyamide elastomer as on the bond area, and an uncoated area that has no coating layer. The coating layer on the bond area is used as heat sealable adhesive that adheres the supplementary cloth to the body cloth whereas that on the extend area is arranged in such a manner as to be exposed to inflation gas upon airbag inflation so as to act as a protective membrane for preventing gas leakage.

9 Claims, 25 Drawing Sheets

U.S. PATENT DOCUMENTS

| | | | |
|---|---|---|---|
| 6,270,113 B1* | 8/2001 | Wipasuramonton et al. | 280/730.2 |
| 6,328,334 B1* | 12/2001 | Kanuma | 280/730.2 |
| 6,355,123 B1* | 3/2002 | Baker et al. | 156/90 |
| 6,435,553 B1* | 8/2002 | Wipasuramonton et al. | 280/743.1 |
| 6,439,606 B2* | 8/2002 | Okada et al. | 280/743.1 |
| 6,550,809 B1* | 4/2003 | Masuda et al. | 280/743.1 |
| 6,712,920 B2* | 3/2004 | Masuda et al. | 156/93 |
| 6,759,355 B2* | 7/2004 | Nagaoka et al. | 442/164 |
| 6,770,578 B2* | 8/2004 | Veiga | 442/164 |
| 6,849,149 B2* | 2/2005 | Otaki et al. | 156/277 |
| 7,022,632 B2* | 4/2006 | Hatta et al. | 442/389 |
| 7,055,858 B2* | 6/2006 | Takimoto et al. | 280/743.1 |
| 7,060,344 B2* | 6/2006 | Pourdeyhimi et al. | 428/175 |
| 7,150,470 B2* | 12/2006 | Okada et al. | 280/743.1 |
| 7,201,396 B2* | 4/2007 | Takimoto et al. | 280/730.1 |
| 7,314,231 B2* | 1/2008 | Abe et al. | 280/730.1 |
| 7,338,069 B2* | 3/2008 | Breed | 280/729 |
| 7,350,801 B2* | 4/2008 | Nakayama | 280/730.1 |
| 7,407,185 B2* | 8/2008 | Maripudi et al. | 280/743.1 |
| 7,431,332 B2* | 10/2008 | Wipasuramonton et al. | 280/730.2 |
| 7,434,837 B2* | 10/2008 | Hotta et al. | 280/743.2 |
| 7,438,310 B2* | 10/2008 | Takimoto et al. | 280/730.1 |
| 7,549,669 B2* | 6/2009 | Keshavaraj | 280/729 |
| 7,549,671 B2* | 6/2009 | Mizuno et al. | 280/730.1 |
| 7,557,052 B2* | 7/2009 | Konishi et al. | 442/148 |
| 7,611,164 B2* | 11/2009 | Kai et al. | 280/729 |
| 7,614,649 B2* | 11/2009 | Kashiwagi | 280/730.1 |
| 7,651,118 B1* | 1/2010 | Veiga | 280/728.1 |
| 7,686,331 B2* | 3/2010 | Li et al. | 280/730.1 |
| 7,744,118 B2* | 6/2010 | Takimoto et al. | 280/730.1 |
| 7,780,191 B2* | 8/2010 | Sato | 280/730.2 |
| 7,789,417 B2* | 9/2010 | Yoshikawa et al. | 280/730.1 |
| 7,806,431 B2* | 10/2010 | Yamada et al. | 280/730.1 |
| 7,820,566 B2* | 10/2010 | Breed et al. | 442/186 |
| 7,874,585 B2* | 1/2011 | Furuno et al. | 280/743.1 |
| 7,891,700 B2* | 2/2011 | Ishida | 280/730.1 |
| 7,934,750 B2* | 5/2011 | Naruse et al. | 280/743.1 |
| 7,951,437 B2* | 5/2011 | Keshavaraj et al. | 428/35.7 |
| 2001/0046823 A1* | 11/2001 | Sogi et al. | 442/59 |
| 2002/0020992 A1* | 2/2002 | Kanuma | 280/730.2 |
| 2002/0055316 A1* | 5/2002 | Araida et al. | 442/382 |
| 2002/0122908 A1* | 9/2002 | Li et al. | 428/36.2 |
| 2002/0145276 A1* | 10/2002 | Veiga | 280/743.1 |
| 2004/0207183 A1* | 10/2004 | Nagata et al. | 280/730.1 |
| 2005/0023809 A1* | 2/2005 | Yamamoto et al. | 280/731 |
| 2006/0202452 A1* | 9/2006 | Breed et al. | 280/730.2 |
| 2006/0217016 A1* | 9/2006 | Lin et al. | 442/59 |
| 2007/0052221 A1* | 3/2007 | Okada et al. | 280/735 |
| 2007/0228699 A1* | 10/2007 | Bederka et al. | 280/730.2 |
| 2008/0042414 A1* | 2/2008 | Nagaoka | 280/743.1 |
| 2008/0174093 A1* | 7/2008 | Inoue | 280/730.2 |
| 2008/0243342 A1* | 10/2008 | Breed | 701/45 |
| 2009/0033076 A1* | 2/2009 | Ikeno et al. | 280/730.2 |
| 2009/0087601 A1* | 4/2009 | Kobayashi et al. | 428/35.4 |
| 2009/0197027 A1* | 8/2009 | Li et al. | 428/36.1 |
| 2010/0320736 A1* | 12/2010 | Traber et al. | 280/743.1 |

FOREIGN PATENT DOCUMENTS

| | | |
|---|---|---|
| JP | 05163658 A * | 6/1993 |
| JP | A-6-227346 | 8/1994 |
| JP | A-8-104194 | 4/1996 |
| JP | 10037057 A * | 2/1998 |
| JP | A-10-129380 | 5/1998 |
| JP | A-2001-163142 | 6/2001 |
| JP | A-2004-218138 | 8/2004 |
| JP | A-2005-179806 | 7/2005 |
| JP | A-2006-103655 | 4/2006 |
| JP | A-2007-308122 | 11/2007 |

* cited by examiner

Enlarged view of site II ated by sewing as well.
AIRBAG

The present application claims priority from Japanese Patent Application No. 2008-252769 of Naruse et al., filed on Sep. 30, 2008 and Japanese Patent Application No. 2009-150258 of Naruse et al., filed on Jun. 24, 2009, the disclosures of which are hereby incorporated into the present application by reference.

BACKGROUND OF THE INVENTION

1. Field of the Invention

The present invention relates to an airbag inflatable with inflation gas.

2. Description of Related Art

JP8-104194 A discloses an airbag that includes a body cloth constituting a circumferential wall, a supplementary cloth applied to the inner surface of the body cloth for reinforcement or the like and an adhesive arranged between the body cloth and supplementary cloth for adhering the supplementary cloth to the body cloth. The airbag is manufactured only by adhesion and without sewing work.

JP6-227346 A discloses an airbag that includes a body cloth, a supplementary cloth and an adhesive used to heat-seal the supplementary cloth to the body cloth and is manufactured by sewing as well.

In the airbags disclosed in above two references, the adhesives are used solely to bond a supplementary cloth to the body cloth. The adhesives are not applied to other area than the area of the supplementary cloth, i.e., not used as a countermeasure against gas leakage of airbag.

JP 2004-218138 A teaches an airbag that is fabricated of a fabric having a layer of water-soluble or water-dispersible coating composition for reducing gas permeability. In this airbag, the coating composition is not used to bond a supplementary cloth to a body cloth.

Moreover, JP 10-129380 A discloses an airbag that is made of two pieces of body cloths each provided with a coating layer of unvulcanized rubber or thermo-plastic polyurethane for preventing gas leakage. The body cloths are coupled together by outer peripheral edges by bonding by vulcanization or heat sealing.

The airbag disclosed in this reference does not include a supplementary cloth. The coating layer is formed all over the body cloths, and thus increasing the weight of the base cloths. Further, if the coating is composed of rubber or polyurethane whereas the fabric forming the base cloths is formed of polyamide fiber, the difference of materials of the coating and fabric would make the airbag unrecyclable.

In this kind of airbag, to summarize, using the same coating composition both for bonding of supplementary cloths and prevention of gas leakage is expected to contribute to simplification of and cost saving in manufacturing of an airbag with means for preventing gas leakage. Specifically, prevention of gas leakage of the body cloth includes prevention of gas leakage through interstices of the texture of woven fabric and prevention of gas leakage caused by scorching and holing of a circumferential wall of the airbag due to hot mist droplets of inflation gas, or the like.

Moreover, reducing an application area of such coating would be desired for weight reduction whereas forming a base cloth of an airbag and coating applied thereto from the same type of material would be desirable from the viewpoint of recyclability.

SUMMARY OF THE INVENTION

The object of the present invention is to provide an airbag that is light in weight, cost saving, easy to manufacture and recyclable although provided with means for preventing gas leakage.

The airbag of the invention includes a body cloth that is made of polyamide woven fabric and constitutes a circumferential wall of the airbag inflatable into a bag shape when fed with inflation gas. The body cloth includes on an inner surface thereof a bond area having a coating layer of polyamide elastomer and to which a supplementary cloth made of polyamide woven fabric is bonded, an extended area having a same coating layer of polyamide elastomer as on the bond area, and an uncoated area that has no coating layer thereon. The coating layer on the bond area acts as heat sealable adhesive that bonds the supplementary cloth to the body cloth whereas that on the extended area is arranged in such a manner as to be exposed to inflation gas upon airbag inflation so as to act as a protective membrane for preventing gas leakage.

With this configuration, the supplementary cloth is bonded to the bond area of the body cloth by heat sealing, using the coating layer as adhesive, such that no sewing work is required to bond the supplementary cloth to the body cloth, and thus simplifying the bonding work. On the other hand, on the extended area, the coating layer functions as the protective membrane that prevents the body cloth from letting gas through and prevents scorching and holing of the body cloth due to hot inflation gas. Further, since the coating layers both on the bond area and extended area are formed of the same polyamide elastomer, work efficiency is improved in manufacturing the airbag having countermeasures against gas leakage while reducing manufacturing cost thereof.

Moreover, the body cloth includes an uncoated area that has no coating layer. This configuration that the coating layer is not formed all over the body cloth but formed only on part of the body cloth, i.e. on the bond area to which the supplementary cloth is bonded and on the extended area which is desired to be leak resistant, is conducive to weight reduction of the airbag. On the other hand, since the body cloth, supplementary cloth and coating layer are made from the same type of material (polyamide), the airbag can be used as recycled material of polyamide easily after processes of cutting and meltdown.

Therefore, the airbag of the invention is light in weight, cost saving, easy to manufacture and recyclable although provided with means for preventing gas leakage.

Specifically, the supplementary cloth will be a reinforcing cloth that enhances heat resistance and/or tensile strength of the body cloth, a redirecting cloth that redirects incoming inflation gas, and so on.

The bond area to which the supplementary cloth is adhered is desirably located on an area of the airbag surrounding mounting holes for receiving means for mounting the airbag to a predetermined location of the vehicle. This configuration helps enhance tensile strength of the area around the mounting hole that is likely to be affected by tensile force upon airbag inflation by distributing the tensile force to the supplementary cloth.

In the above airbag, the supplementary cloth may also be provided on a side adhered to the body cloth with a same coating layer of polyamide elastomer as formed on the body cloth. This configuration will conduce to reduce the amount of coating composition of polyamide elastomer applied to the bond area of the body cloth while assuring bond strength of the body cloth to the supplementary cloth. Further, the total application quantity of the coating composition applied to the body cloth, i.e., not only to the bond area but also to the extended area, will be reduced and thereby lightening the airbag. Nevertheless the amount of the coating composition applied to the extended area must be sufficient for assuring gas-leak prevention.

The airbag may include more than one supplementary cloths bonded to the bond area such that the bond area has a laminated structure. In this case, it is desired that each of the supplementary cloths is directly or indirectly adhered to the body cloth on the bond area, that each component cloth, which is a conception that includes the body cloth and supplementary cloths, has the coating layer on one surface, and that the bond area includes in between the component cloths an adhesion area that bonds a pair of the component cloths together. The adhesion area is formed between a pair of component cloths immediately adjoining each other or between a pair of component cloths that have at least one other component cloth interposed and at a part of the other component cloth where there is no cloth such that the base cloth and all the supplementary cloths are bonded together without a fear of slippage from one another in a direction orthogonal to a layering direction of the cloths.

According to the above, all the component cloths forming the laminated structure are bonded together without a fear of slippage by combination of an adhesion area formed between adjoining component cloths and an adhesion area formed at the "no-cloth area", or only by an adhesion area(s) formed at the no-cloth area. This configuration will make it easier to insert means for mounting the airbag onto a vehicle, such as bolts of a retainer, into mounting holes of the body cloth via the supplementary cloths, and thus improving handleability of the airbag.

Further, since all the supplementary cloths are directly or indirectly bonded to the body cloth, the tensile force that acts on the body cloth at airbag inflation will be distributed among the supplementary cloths, and thus enhancing the tensile strength of the body cloth.

At the bonding work during manufacturing of the airbag, if heat sealing together coating layers of adjoining component cloths and/or heat sealing together coating layers of component cloths having other cloth interposed at the no-cloth area, any arbitrary pairs of the component cloths can be bonded together such that all the component cloths are bonded together without sewing or the like although each component cloth has the coating layer only on one side.

Moreover, when, by way of example, forming mounting holes for receiving such mounting means as bolts of a retainer, the mounting holes can be formed on the laminated area by laser cutting or the like after bonding all the component cloths. At this time, since the component cloths are prevented from slipping from one another, the mounting holes are formed smoothly at desired positions.

Therefore, although including a laminated structure of three or more sheets of the component cloths (e.g. the body cloth and two sheets of supplementary cloths) on the laminated area, the airbag of the invention will readily be manufactured and secure a good handleability.

The no-cloth area may be comprised of a through hole (which can also be referred to as an inner space) formed on other component cloth interposed between a pair of component cloths adhered together. Alternatively, the no-cloth area may be comprised of a region (which can also be referred to as an outer space) between a pair of component cloths adhered together and located outside of the other component cloth interposed between the component cloths adhered together.

It is desired that the airbag of the invention includes a high-pressure chamber that is located upstream of inflation gas channel and a low-pressure chamber that is partially communicated with the high-pressure chamber and is kept at low pressure relative to the high-pressure chamber in the course of airbag inflation and that the extended area having the coating layer constitutes the high-pressure chamber.

With this configuration, the coating layer on the extended area is preferably utilized to prevent gas-leak and keep the inner pressure of the high-pressure chamber higher than the low-pressure chamber from an initial stage to final stage of airbag inflation. As a result, even in the event that a target of protection (i.e. a vehicle occupant) has high kinetic energy upon contact with the airbag, the airbag receives him/her initially by the high-pressure chamber, reducing his/her kinetic energy and then receives him/her with the low-pressure chamber softly.

By way of example, the above configuration may be applied to an airbag mounted on a lateral of a seat of a vehicle, such that the high-pressure chamber acts as a pelvis protection area that restrains a pelvis section of a seated occupant whereas the low-pressure chamber acts as an upper protection area that is located above the pelvis protection area for restraining a region of the occupant above the pelvis section. With this configuration, when the airbag inflates upon a side impact of the vehicle, the airbag receives the pelvis section of the occupant having high kinetic energy by the high-pressure chamber or the pelvis protection area, reducing the kinetic energy, and then receives the upper body of the occupant by the low-pressure chamber or the upper protection area softly, and thus protecting the occupant in a preferable manner.

Alternatively, the extended area having the coating layer may be located on an area proximate the gas inlet port which is to be subjected to mist of inflation gas.

With this configuration, the coating layer prevents hot mist droplets from scorching and holing the body cloth which would otherwise cause gas leak. Specifically, the coating layer prevents heat transfer from such mist droplets in the event that droplets adhere to the extended area. Further, if such droplets once contact the extended area and then are blown off toward the uncoated area of the body cloth, scorching will be prevented as well since the extended area has drawn heat from the droplets upon contact.

By way of example, the above configuration may be applied to an airbag that is mounted in front of a front passenger's seat of a vehicle and includes a redirecting cloth that is arranged to cover a gas inlet port and includes a front outlet that redirects incoming inflation gas forward and a rear outlet that redirects incoming inflation gas rearward. The extended area having the coating layer is located in the vicinity of the front outlet and rear outlet of the redirecting cloth. According to the above, the extended area located proximate the front and rear outlets receives hot mist droplets of inflation gas by itself or lowers their heat when inflation gas flows out of the front and rear outlets and hit the extended area. As a result, the body cloth, both on the extended area and uncoated area, is prevented from scorching due to inflation gas. Thus the airbag unfolds widely in a vertical direction without a partial rearward protrusion by inflation gas redirected by the redirecting cloth, and receives an occupant by a wide restraint plane without giving a partial pressure to the occupant.

Some airbags for a front passenger's seat have the following structure: the body cloth includes a restraint panel arranged generally vertically facing toward the rear and a vehicle body side panel extending forward from the outer peripheral edge of the restraint panel in a generally square conical, narrowing fashion. The vehicle body side panel as deployed includes an upper region which is a generally upper half circumferential region of the square cone and a lower region which is a generally lower half circumferential region of the square cone. The gas inlet port is formed in a front area of the lower region such that the airbag is secured to an airbag housing at a peripheral area of the gas inlet port by being held down by a retainer housed in the airbag.

On the other hand, the redirecting cloth is formed into a tube extending in an anteroposterior direction, having a round opening shape and in which the front outlet has a greater opening area than the rear outlet. The redirecting cloth is held down onto the airbag housing by the retainer together with the peripheral area of the gas inlet port. In a vertical, anteroposterior sectional view of the airbag as secured to the airbag housing and fully inflated by itself, with respect to the height from a base line that extends along an opening plane of the gas inlet port, the height at an upper edge of the front outlet is greater than that at an upper edge of the rear outlet, and the upper edge of the rear outlet is located at the rear relative to a rear edge of a portion of the redirecting cloth held down by the retainer.

The extended area of the above airbag is desirably determined as follows, in a vertical, anteroposterior sectional view of the airbag as secured to the airbag housing and fully inflated by itself:

the region of the extended area in front of the front outlet extends upward on the upper region of the vehicle body side panel from the front edge of the redirecting cloth at the vicinity of a front periphery of the gas inlet port, up to or beyond an intersecting point of the upper region of the vehicle body side panel and a front perpendicular line that extends forward from the upper edge of the front outlet perpendicularly to a front vertical straight line that connects a point of the redirecting cloth immediately below a front end of the retainer and the upper edge of the front outlet; and the region of the extended area at the rear of the rear outlet extends rearward on the lower region of the vehicle body side panel from a rear edge of the redirecting cloth at the vicinity of a rear periphery of the gas inlet port, up to or beyond an intersecting point of the lower region of the vehicle body side panel and a rear perpendicular line that extends rearward from the upper edge of the rear outlet perpendicularly to a rear vertical straight line that connects a point of the redirecting cloth immediately below a rear end of the retainer and the upper edge of the rear outlet.

The extended area thus determined receive a major part of the inflation gas exiting the front outlet and rear outlet straightly, and therefore, such scorching as forms a hole due to inflation gas is prevented both on the extended area and uncoated area of the body cloth.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
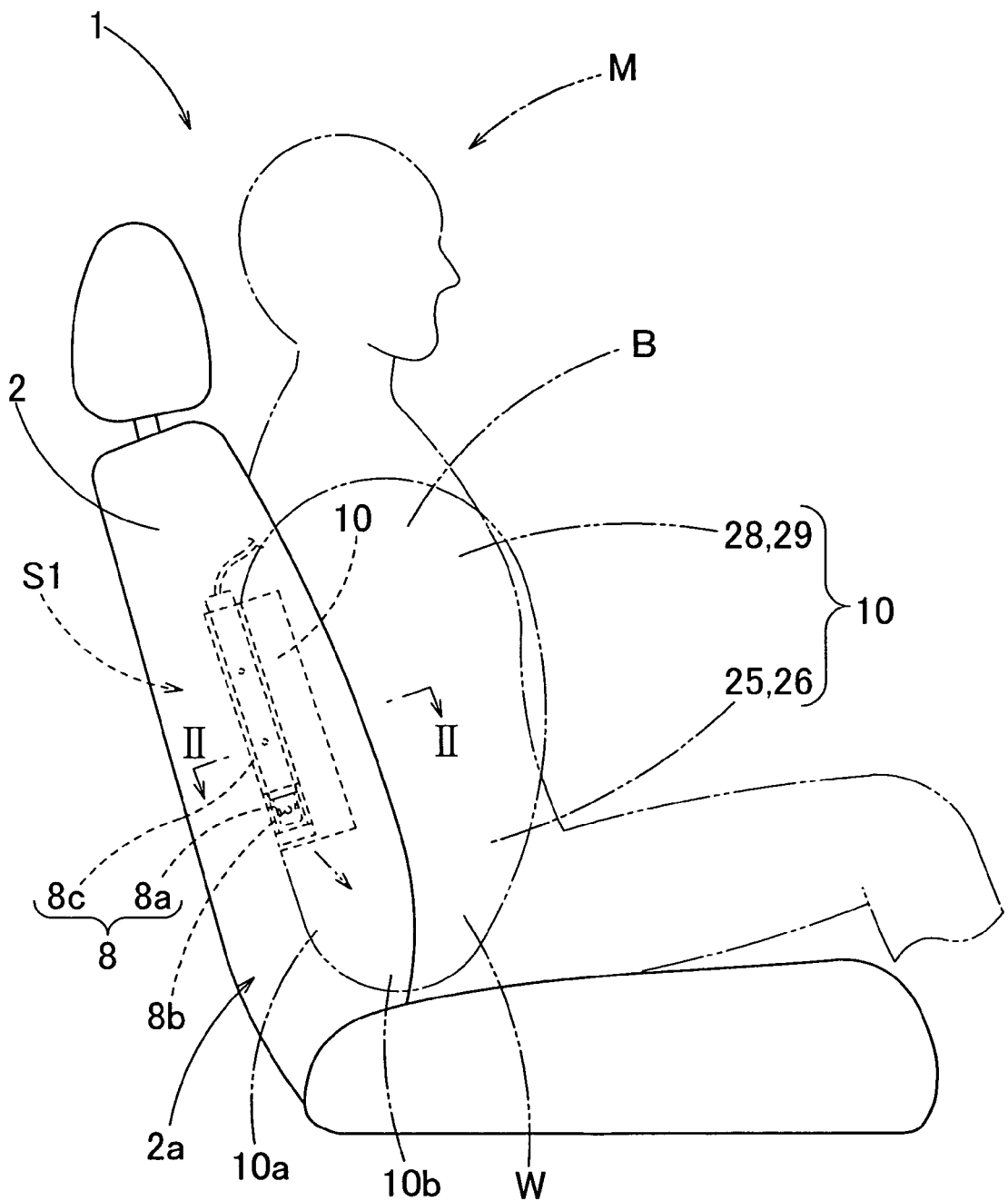
FIG. 1 is a side view of a seat of a vehicle equipped with a side airbag apparatus that employs an airbag according to the first embodiment of the invention.

As shown in FIG. 1, an airbag 10 according to the first embodiment of the invention is described for illustrative purpose as is used in an airbag apparatus S1 mounted on an outer lateral 2a of a seat back 2 of a seat 1 of a vehicle.

Figure 2:
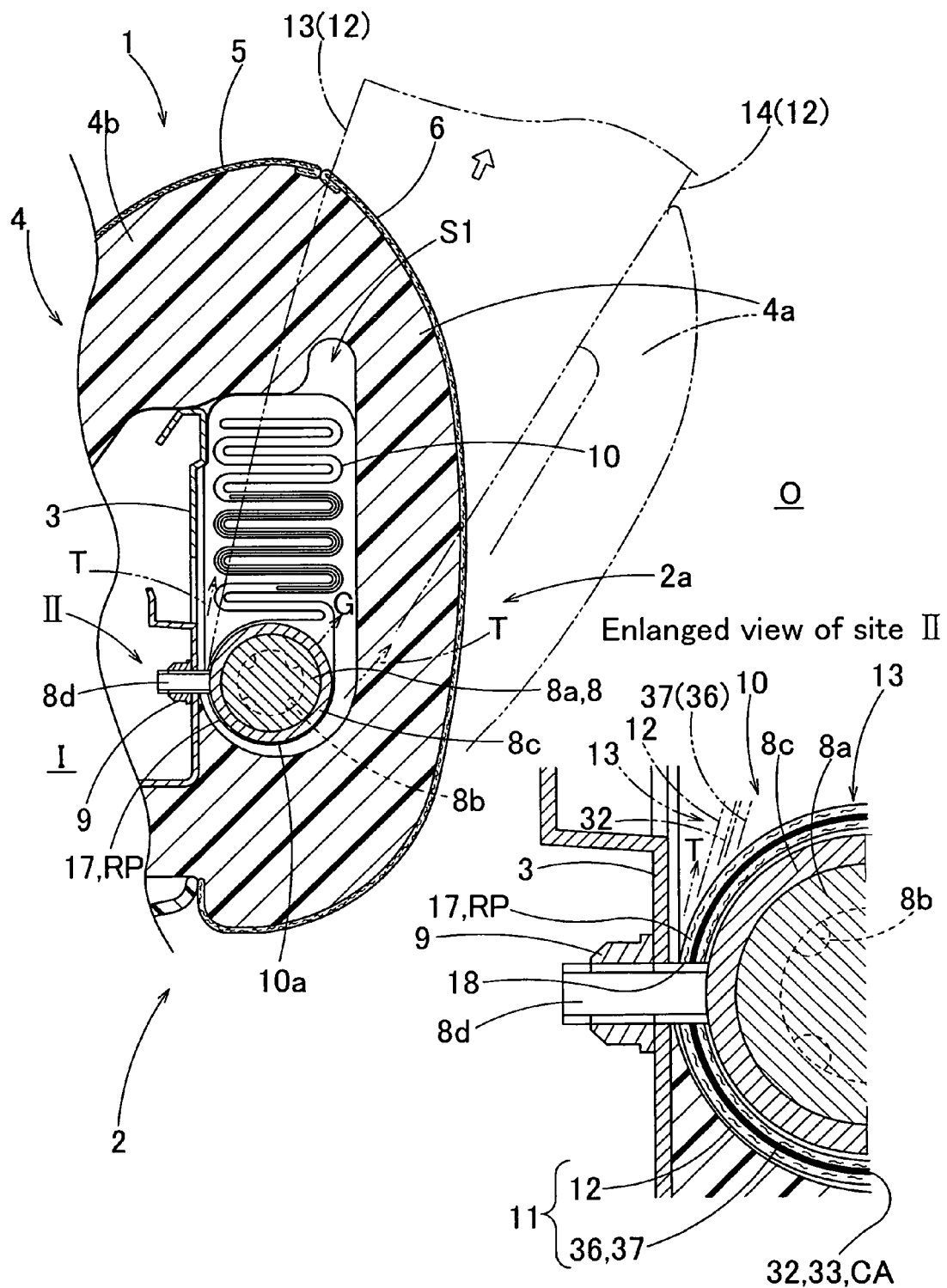
FIG. 2 is a schematic horizontal section of the airbag apparatus of FIG. 1 taken along line II-II of FIG. 1.

The seat back 2 includes a frame 3 extending generally vertically. As shown in FIG. 2, the airbag apparatus S1 is secured to the frame 3 by fastening bolts 8d of a later-described inflator 8 with nuts 9. In FIG. 2, a member indicated at 4 is a cushion, and members indicated at 5 and 6 are surface skins made of decoration fabric or the like. The right edge portion 4a of the cushion 4 covers the airbag apparatus S1 on the front and the outer side. Upon deployment of the airbag 10, the edge portion 4a is pushed by the airbag 10 and separated from a center part 4b of the cushion 4.

The airbag apparatus S1 includes an airbag 10 and an inflator 8 housed inside the airbag 10 for supplying the airbag 10 with inflation gas.

Figure 3:
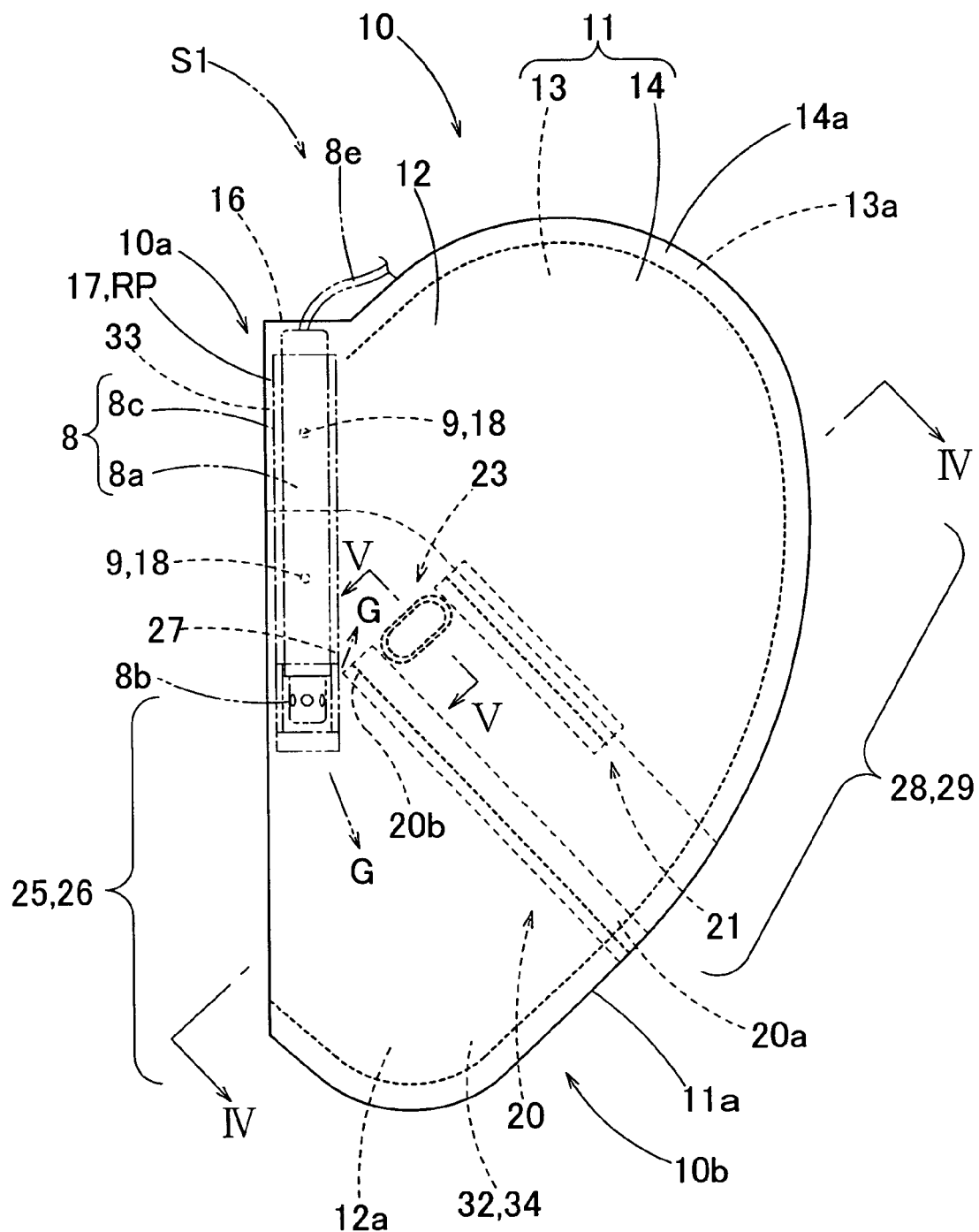
FIG. 3 is a front view of the airbag of the first embodiment.

The inflator 8 includes a body 8a which is columnar in shape and provided on the bottom with gas discharge ports 8b and a retainer 8c formed into a cylinder and holding the body 8a. As shown in FIGS. 2 and 3, the retainer 8c includes bolts 8d projecting towards and nut fastened to the frame 3 of the seat 1. The bolts 8d are located at two remote positions in a vertical direction.

As shown in FIGS. 1 and 2, intended to protect a pelvis section W and an upper body B of an occupant M seated in the seat 1, the airbag 10 is designed to inflate into a generally oval plate shape elongated in a vertical direction. The airbag 10 includes an inboard side panel 13 and an outboard side panel 14. The inboard side panel 13 acts as a restraint panel that restrains the occupant M. The inflator 8 is housed at a location 10a of the airbag 10 to be the rear end upon deployment. The rear end region 10a is provided on the inboard side panel 13 with two mounting holes 18 for receiving the bolts 8d of the retainer 8c of the inflator 8. The area of the airbag 10 around the mounting holes 18 acts as a mounting area 17 at which the airbag 10 is secured to the seat frame 3.

Figure 4:
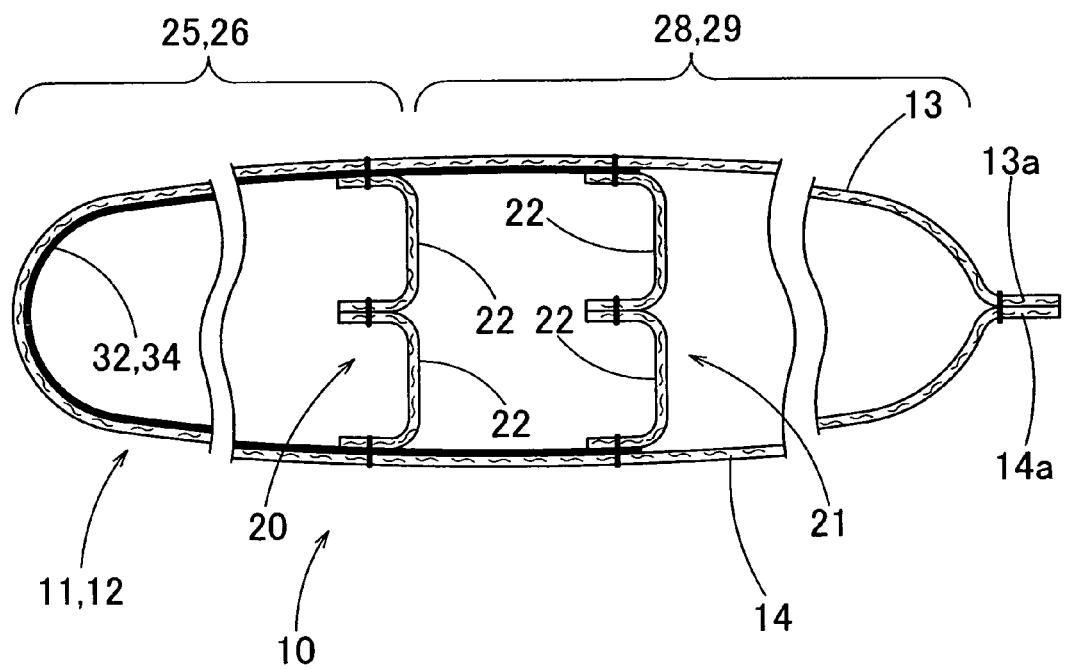
FIG. 4 is a sectional view of the airbag of FIG. 3 as inflated, taken along line IV-IV of FIG. 3.
Figure 5:
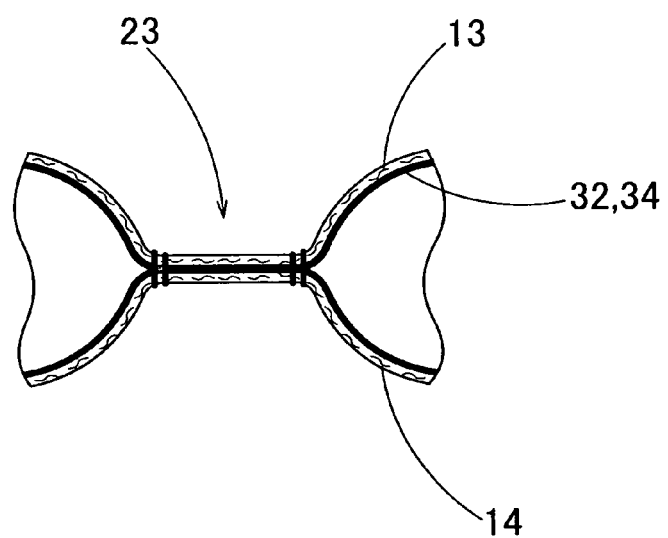
FIG. 5 is a sectional view of the airbag of FIG. 3 as inflated, taken along line V-V of FIG. 3.

Referring to FIGS. 3 to 5, the airbag 10 includes three connecting portions 20, 21 and 23 that couple the inboard side panel 13 and outboard side panel 14 together. The connecting portions 20 and 21 are formed into such tethers that interlock the panels 13 and 14 with a clearance therebetween. Each of the connecting portions 20 and 21 is formed of tether cloths 22 that are respectively sewn to the inboard side panel 13 and outboard side panel 14 at first ends and sewn together at second ends. The connecting portion 23 sews the panels 13 and 14 together so that the panels 13 and 14 contact with each other.

The connecting portion 20 is so formed as to divide the airbag 10 into a pelvis protection area 26 that is located proximate the lower end 10b for protecting the pelvis section W of an occupant M and an upper protection area 29 that protects un upper body B of the occupant M. The connecting portion 21 is located generally at the center in a vertical direction of the airbag 10. The connecting portion 23 is located in the vicinity of the mounting area 17 in such a manner as to join the connecting portions 20 and 21 together. The connecting portion 20 extends obliquely downward from the rear end 20b located in the vicinity of the mounting area 17 and above the gas discharge ports 8b of the inflator 8, and reaches the outer peripheral edge 11a of the airbag 10 at the front end 20a.

The connecting portion 20 locates the pelvis protection area 26 upstream of a channel of inflation gas G exiting the gas discharge ports 8b, and provides a narrow gap or communication port 27 between the rear end 20b and the inflator 8 since the rear end 20b of the connecting portion 20 is located proximate the mounting area 17 and above the gas discharge ports 8b. This configuration enables the pelvis protection area 26 located upstream of inflation gas channel to retain inflation gas G exited the gas discharge ports 8b for a certain period of time and keep high pressure whereas the upper protection area 29 inflates with inflation gas G exiting the communication port 27. That is, the pelvis protection area 26 acts as a high-pressure chamber 25 that is kept at high pressure in the course of airbag inflation whereas the upper protection area 29 acts as a low-pressure chamber 28 that is partially communicated with the high pressure chamber 25 and is kept at low pressure relative to the high-pressure chamber 25.

Figure 6A:
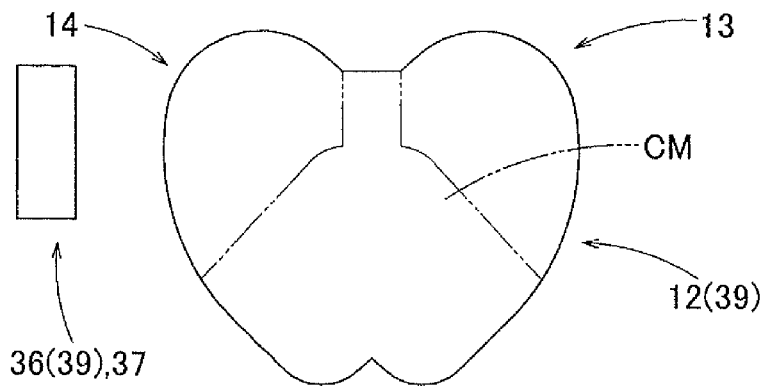
FIGS. 6A, 6B, 6C, 7A and 7B illustrate the manufacturing process of the airbag of FIG. 3 in order.
Figure 6B:
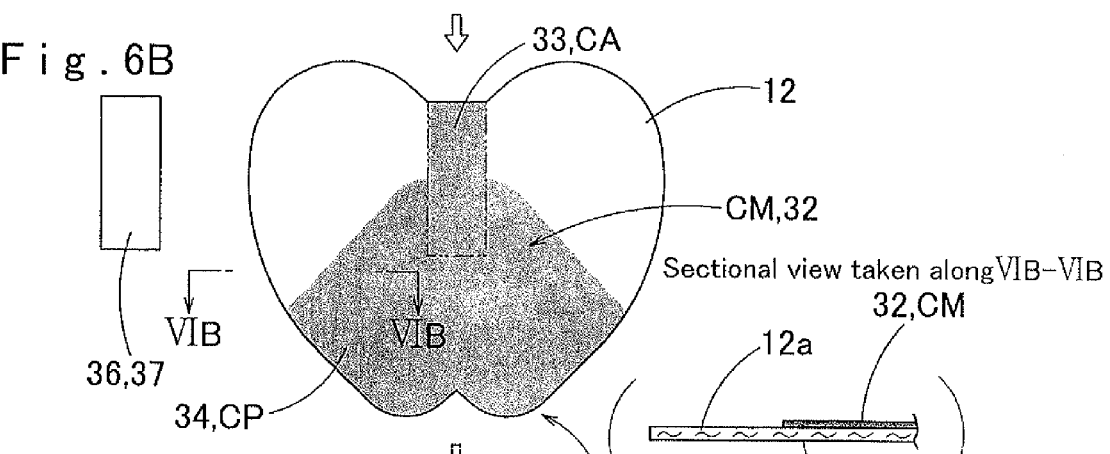
Figure 6C:
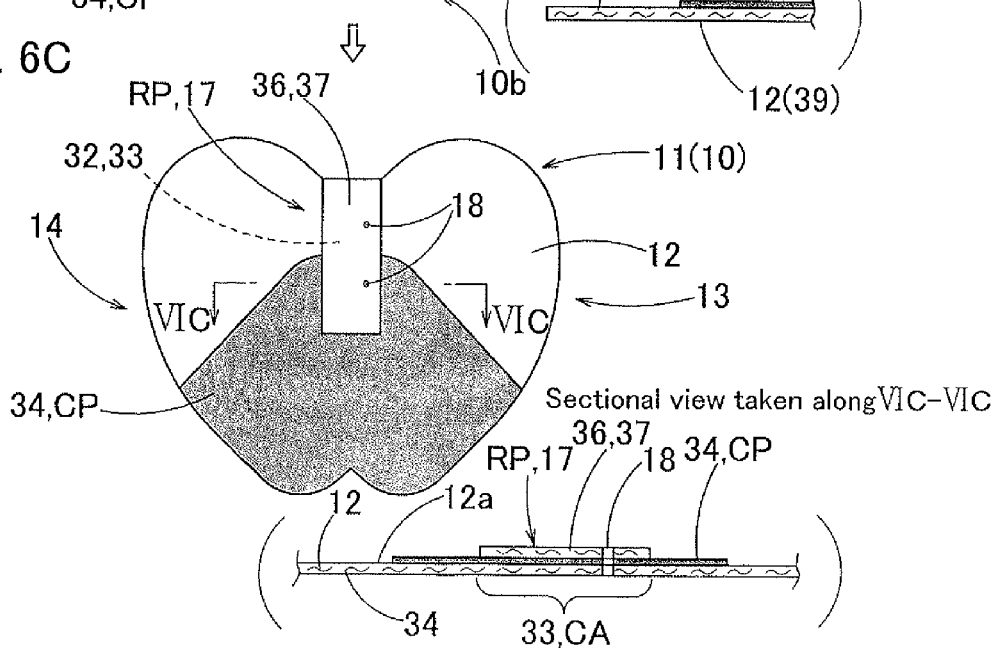

As shown in FIGS. 3 and 6C, the airbag 10 is composed of a body cloth 12 inflatable into a bag shape and a reinforcing cloth 37 acting as a supplementary cloth 36 that is applied to part of the body cloth 12. The reinforcing cloth 37 is adhered to the mounting area 17 at the rear end 10a of the airbag 10 on which a tensile force T (FIG. 2) acts upon airbag deployment. The area with the reinforcing cloth 37 will be called reinforced area or reinforcement area RP.

As shown in FIGS. 6A and 6B, the body cloth 12 is formed into a shape like a butterfly in which the inboard side panel 13 and outboard side panel 14 are continuous at the mounting area 17. The body cloth 12 includes a coating layer 32. The reinforcing cloth 37 has a rectangular plate shape. The reinforcing cloth 37 is heat sealed to the body cloth 12 utilizing the coating layer 32 of the body cloth 12 as an adhesive CA.

Figure 7A:
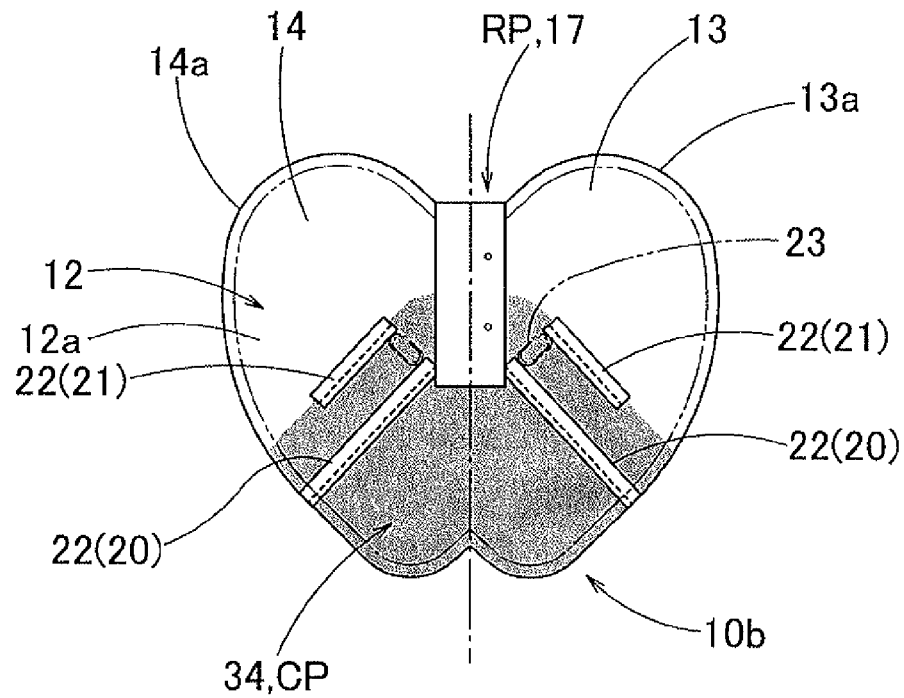
Figure 7A:
Figure 7B:
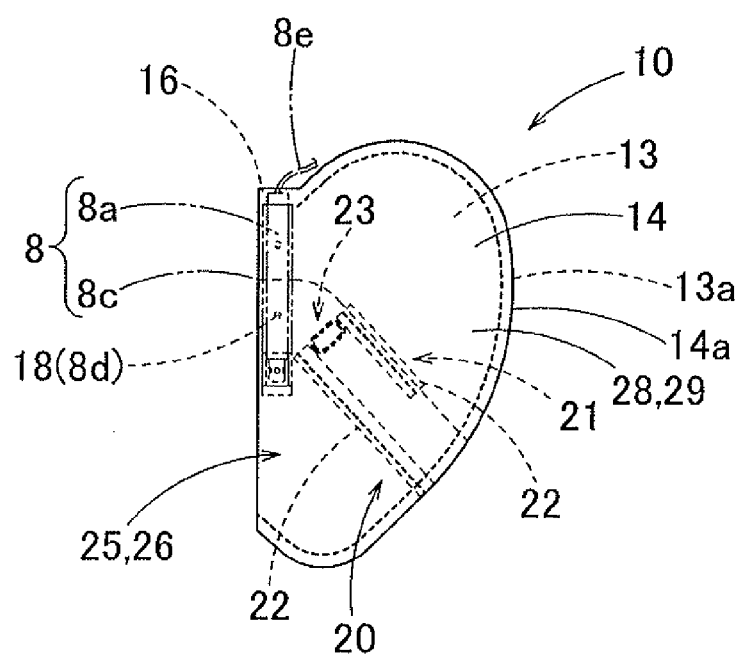

Referring to FIGS. 6B, 6C and 7A, the coating layer 32 is formed on a generally triangular area on the inner surface 12a the body cloth 12 including the rectangular reinforcement area RP to which the reinforcing cloth 37 is applied (which will also be referred to as a bond area 33). The coating layer 32 extends up to the vicinity of the location of the connecting portion 23. The extended area 34 is an area having the coating layer 32 except the bond area 33. Specifically, the extended area 34 is an area extending from the lower end 10b of the airbag 10 to the location of the connecting portion 21 encompassing the connecting portion 20. The coating layer 32 acts as a protective membrane CP for preventing gas leakage and is exposed to inflation gas G upon airbag inflation. In the airbag 10 of the first embodiment, the protective membrane CP helps improve heat resistance of the body cloth 12 and prevents inflation gas G from leaking through interstices of the fabric 39 of the body cloth 12 such that the high-pressure chamber 25 keeps the inner pressure high (FIG. 7B).

The body cloth 12 and reinforcing cloth 37 are cut out from a single sheet of fabric 39. The fabric 39 is a plain-weave fabric of polyamide yarn made of polyamide fiber. Polyamide elastomer is adopted as the coating composition CM to form the coating layer 32 because it is heat-sealable, does not inhibit flexibility of the fabric 39, improves impermeability, and further is recyclable together with the fabric 39.

More specifically, the fabric 39 is a plain weave of nylon 66 multiple wound yarn with fineness of 350 dtex (315 denier), at density of 59 yarns/inch (warp) and 59 yarns/inch (weft), cover factor $(K)=59\times(315)^{0.5}+59\times(315)^{0.5}=2094$. Polyether block polyamide is employed as the polyamide elastomer (PA elastomer) used for the coating composition CM. The coating composition CM is applied to the body cloth 12 cut out from the fabric 39 and partially masked in the form of dispersion liquid or emulsion, utilizing spray coating, brush coating, printing technique such as a transfer roll and so on, and the body cloth 12 thus coated is then subjected to drying under 175° C. for 2 minutes and thus forming the coating layer 32.

In this specific embodiment, the coating amount of the coating composition CM is 12.5 gm$^{-2}$.

Manufacturing of the airbag 10 of the first embodiment is now described. Firstly, the body cloth 12 and reinforcing cloth 37 are cut out from the fabric 39. Then the coating composition CM is applied on the bond area 33 and extended area 34 of the body cloth 12 as flattened and then dried to provide the coating layer 32 as described above and shown in FIGS. 6A and 6B. Subsequently, as shown in FIGS. 6B and 6C, the reinforcing cloth 37 is bonded to the reinforcement area RP of the body cloth 12 by heat sealing. Specifically, the body cloth 12 is laid on a support bed of a heat press machine with the coating layer 32 facing upward, and the reinforcing cloth 37 is placed over the reinforcement area RP. Then a heating plate of the heat press machine is depressed to apply pressure and heat. If then drilling the mounting holes 18, the mounting area 17 is completed as shown in FIG. 6C.

The coating layer 32 may also be formed by applying coating composition CM on a predetermined area of the fabric 39 to be the body cloth 12 in advance.

Thereafter, as shown in FIG. 7A, the tether cloths 22 are respectively sewn to the inner surface 12a of the inboard side panel 13 and outboard side panel 14 of the body cloth 12 and then as shown in FIG. 7B, the second ends of each pair of the tether cloths 22 are sewn together to form the connecting portions 20 and 21. Then the inboard side panel 13 and outboard side panel 14 are overlapped and sewn together at outer peripheral edges 13a and 14a, and the connecting portion 23 is formed by sewing together the panels 13 and 14 at a predetermined position. Thus the airbag 10 is completed.

After completing the airbag 10, the inflator 8 is inserted into the airbag 10 via an assembling hole 16 (FIG. 7B) such that the bolts 8d of the inflator 8 project out of the mounting holes 18. Then the airbag 10 is folded up and the bolts 8d are fastened to the frame 3 of the seat 1 by nuts 9, thus securing the airbag apparatus S1 to the seat back 2 of the seat 1. The seat 1 is finished by mounting the surface skins 5 and 6 on the seat 1 provided with the airbag apparatus S1, and the seat 1 is mounted on a vehicle. At this time, a harness 8e (FIG. 7B) extending from the inflator 8 is connected to a predetermined circuit for activating the airbag apparatus.

If a predetermined signal is fed to the inflator body 8a via the harness 8e, inflation gas G is discharged from the discharge ports 8b and the airbag 10 inflates and deploys while separating the edge portion 4a of the cushion 4 from the center part 4b as indicated by double-dashed lines in FIGS. 1 and 2.

In the airbag 10 of the first embodiment, referring to FIG. 3, the connecting portion 20 extending up to above the gas discharge ports 8b guides inflation gas G into the high-pressure chamber 25 (pelvis protection portion 26) and inflates the high-pressure chamber 25 and then inflation gas G escaped via the communication port 27 provided between the inflator 8 and the rear end 20b of the connecting portion 20 flows into and inflates the upper protection portion 29 (low-pressure chamber 28), thus completing the inflation of the whole airbag 10. The airbag 10 protects the pelvis section W and upper body B of an occupant M seated in the seat 1 properly with the high-pressure chamber 25 (pelvis protection portion 26) and upper protection portion 29 (low-pressure chamber 28), as indicated by double-dashed lines in FIG. 1.

Now referring to FIGS. 6A, 6B and 6C, the coating layer 32 on the bond area 33 of the body cloth 12 is used as the adhesive CA bonding the reinforcing cloth 37 (or supplementary cloth 36) to the body cloth 12, such that no sewing work is required to bond the reinforcing cloth 37 to the body cloth 12, and thus simplifying the bonding work. On the other hand, on the extended area 34, the coating layer 32 functions as the protective membrane CP for preventing the body cloth 12 from letting gas through since it is so formed as to be exposed to inflation gas G. Further, the coating layer 32 is formed by applying the same emulsion of polyamide elastomer (the coating composition CM) both to the bond area 33 and extended area 34, and therefore, work efficiency in manufacturing the airbag 10 having countermeasures against gas leakage is improved while reducing manufacturing cost thereof.

Moreover, the configuration that the coating layer 32 is not formed all over the body cloth 12 but formed only on part of the body cloth 12, i.e. on the bond area 33 to which the reinforcing cloth 37 is bonded and on the extended area 34 which is desired to be leak resistant is conducive to weight reduction of the airbag 10. On the other hand, since the fabric 39 forming the body cloth 12 and reinforcing cloth 37 and the coating layer 32 are made from the same type of material (polyamide), the airbag 10 can be used as recycled material of polyamide easily after processes of cutting and meltdown.

Therefore, the airbag 10 of the first embodiment is light in weight, cost saving, easy to manufacture and recyclable although provided with means for preventing gas leakage.

Moreover, the bond area 33 of the airbag 10 to which the reinforcing cloth 37 is bonded is located on the mounting area 17 that is provided with the mounting holes 18 for receiving mounting means or bolts 8d that mounts the airbag 10 to the seat frame 3. The reinforcing cloth 37 is conducive to distribution of the tensile force T which acts upon the body cloth 12 and therefore improves tensile strength of the body cloth 12 (see an enlarged view of site II of FIG. 2).

Figure 21:
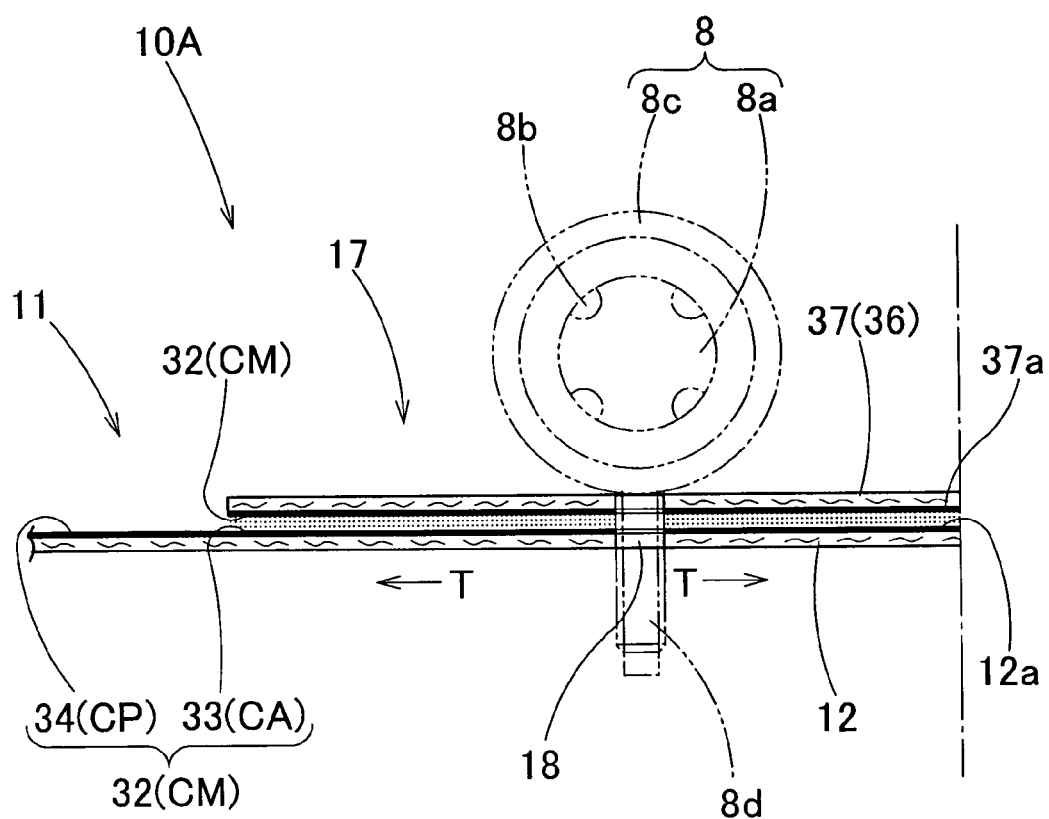
FIG. 21 is a vertical section of a vicinity of a mounting hole of a modification of the airbag of the first embodiment.

Although the coating layer 32 of the airbag 10 has been described as is formed only on the body cloth 12 in the foregoing embodiment, it will also be appreciated, as in an airbag 10A shown in FIG. 21, that the reinforcing cloth 37 includes on the side 37a adhered to the body cloth 12 a coating layer 32 as well such that the coating layers 32 of both the body cloth 12 and reinforcing cloth 37 are heat sealed together. This configuration will conduce to reduce the amount of the coating composition CM applied to the bond area 33 of the body cloth 12 while assuring bond strength of the body cloth 12 to the reinforcing cloth 37. Further, the total application quantity of the coating composition CM applied to the body cloth 12, i.e., not only to the bond area 33 but also to the extended area 34, will be reduced and thereby lightening the airbag 10A. Nevertheless the amount of the coating composition CM applied to the extended area 34 must be sufficient for assuring gas-leak prevention.

The airbag 10 of the first embodiment includes the high-pressure chamber 25 that is located upstream of inflation gas channel and kept at high pressure in the course of airbag inflation and the low-pressure chamber 28 that is partially communicated with the high-pressure chamber 25 and is kept at low pressure relative to the high-pressure chamber 25, and the extended area 34 having the coating layer 32 constitutes the high-pressure chamber 25. That is, the coating layer 32 is preferably utilized to prevent gas-leak and keep the inner pressure of the high-pressure chamber 25 higher than the low-pressure chamber 28 from an initial stage to final stage of airbag inflation. As a result, even in the event that an occupant M has high kinetic energy upon contact with the airbag 10, the airbag 10 receives the occupant M initially by the high-pressure chamber 25, reducing the kinetic energy and then receives him/her with the low-pressure chamber 28 softly.

Especially, the airbag 10 of the first embodiment is configured to be used for a side airbag apparatus S1 mountable on a lateral of a seat 1 of a vehicle, and the high-pressure chamber 25 acts as the pelvis protection area 26 intended to protect the pelvis section W of an occupant M seated in the seat 1 whereas the low-pressure chamber 28 acts as the upper protection area 29 that is located above the pelvis section area 26 for protecting the upper body B of the occupant M. With this configuration, when the airbag 10 inflates upon a side impact of the vehicle, the airbag 10 receives the pelvis section W of an occupant M having high kinetic energy by high-pressure chamber 25 (the pelvis protection area 26) reducing the kinetic energy, and then receives the upper body B of the occupant M by the low-pressure chamber 28 (the upper protection area 29) softly, and thus protecting the occupant M in a preferable manner.

Figure 28A:
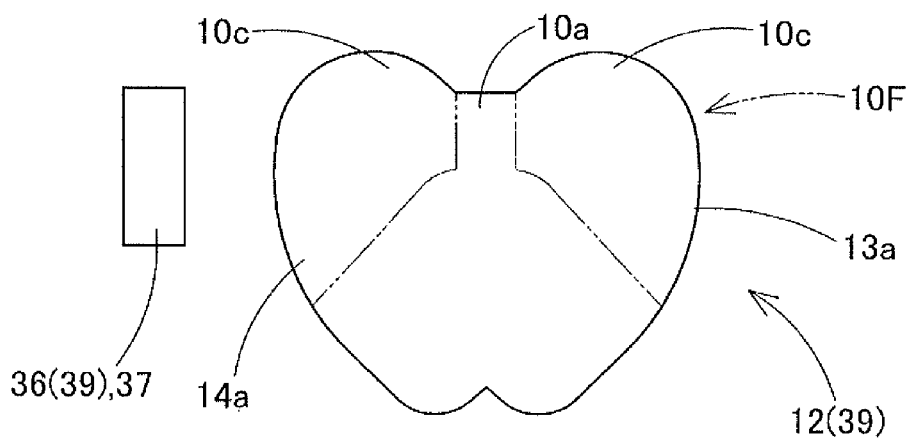
FIGS. 28A, 28B, 28C, 29A, 29B and 29C illustrate the manufacturing process of still another modification of the airbag of the first embodiment in order.
Figure 28B:
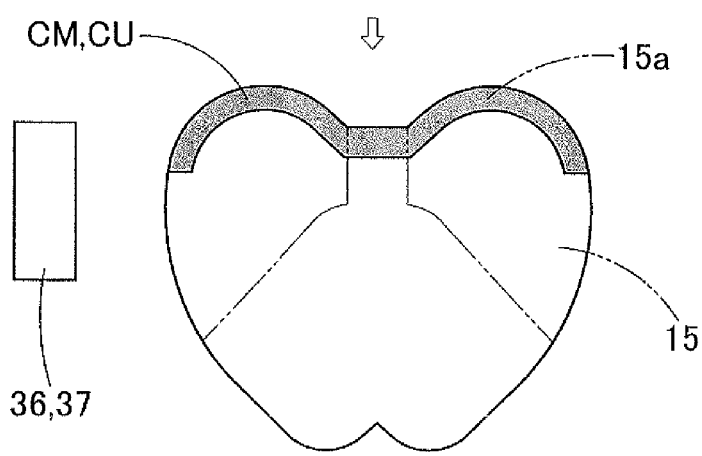
Figure 28C:
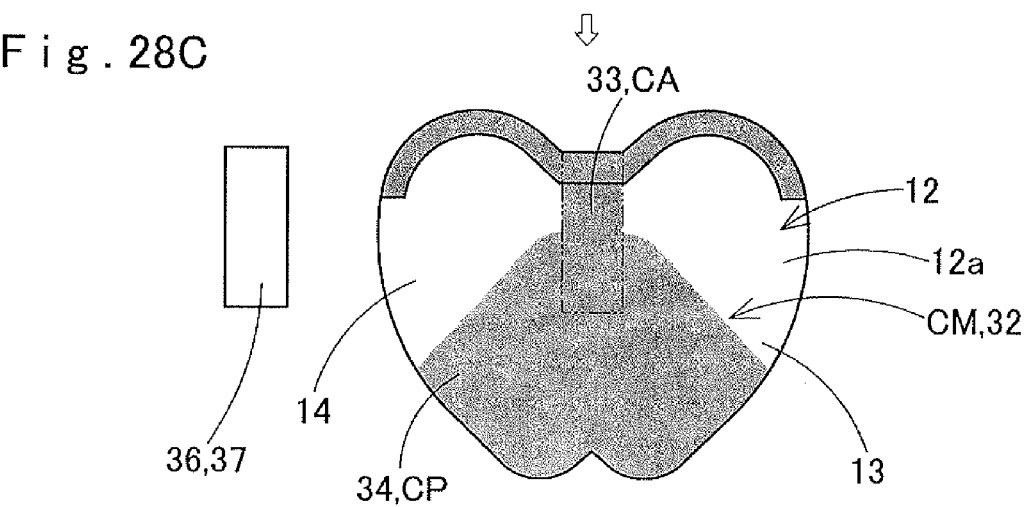
Figure 29A:
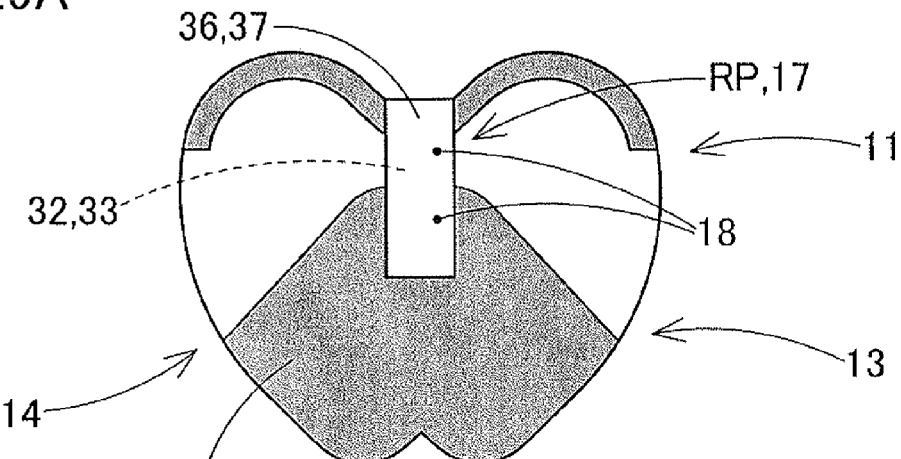
Figure 29B:
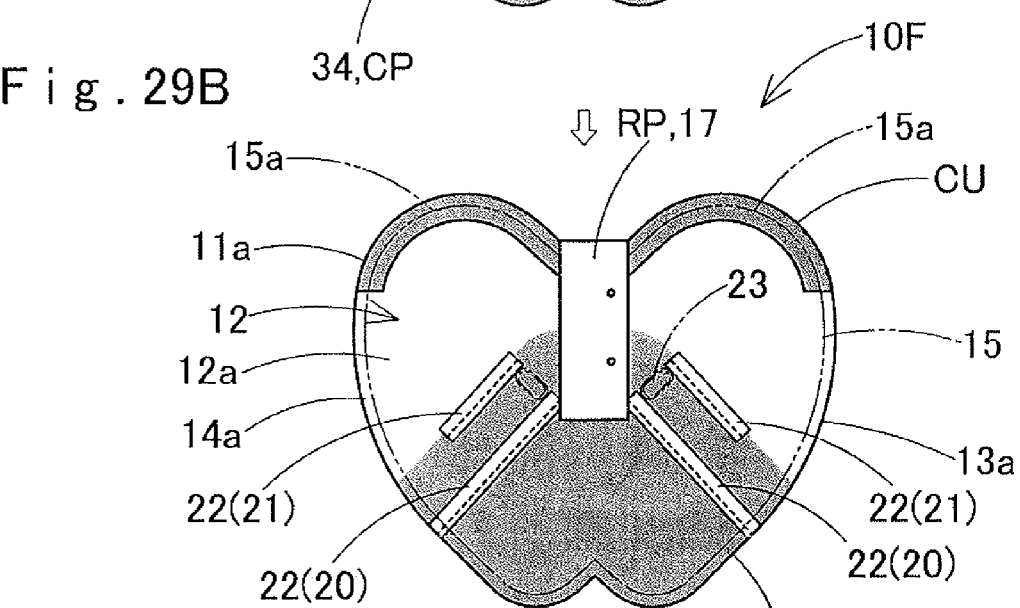
Figure 29C:
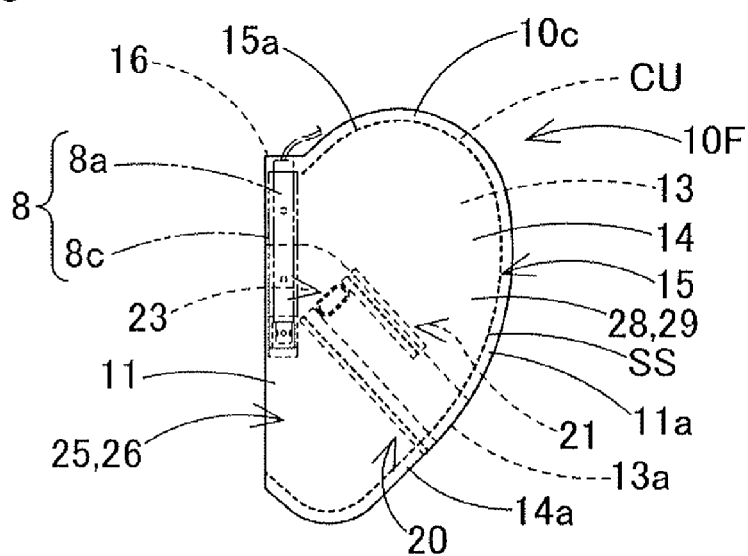

In the airbag 10 of the first embodiment, the coating layer 32 on the extended area 34 is primarily provided to enhance heat resistance of textile threads of the body cloth 12 for attaining low permeability of the body cloth 12. However, as in an airbag 10F shown in FIGS. 28A to 29C and described below, the coating composition CM forming the coating layer 32 may also be used to prevent gas leak from the seam 15 that sew outer peripheral edges of the airbag 10F together by sewing threads SS (FIG. 29C). The coating composition CM in this embodiment is applied to a region of the airbag 10F to become an upper part 15a of the seam 15 in such a manner as to intrude into interstices of threads weaving the body cloth 12. Specifically, referring to FIGS. 28A and 28B, the coating composition CM is applied to the region of the airbag 10F to become the upper part 15a of the seam 15, in other words to an upper peripheral region 10c on the inboard-side panel 13 and outboard-side panel 14, and then that region is heated at such temperature that is lower than the melting point (260° C.) of the body cloth 12 and can fuse the coating composition CM, at about 180° C., in this embodiment, for one minute, such that the coating composition CM penetrate into interstices of textile threads of the body cloth 12 and form a cushion portion CU around the upper part 15a of the seam 15. The process of manufacturing the airbag 10F after the application of the coating composition CM is similar to that of the airbag 10 of the first embodiment. As shown in FIG. 28C, the coating composition CM is applied to the bond area 33 and extended area 34 of the body cloth 12 as flattened and then dried to provide the coating layer 32. Subsequently, as shown in FIG. 29A, the reinforcing cloth 37 is bonded to the reinforcement area RP of the body cloth 12 by heat sealing. The heat sealing is desirably so done that the heating plate of the heat press does not contact the cushion portion CU, otherwise the coating composition CM on the cushion portion CU would melt and stick to the heating plate. If then drilling the mounting holes 18, the mounting area 17 is completed. Thereafter as shown in FIG. 29B, the tether cloths 22 are respectively sewn to the inner surface 12a of the inboard side panel 13 and outboard side panel 14 of the body cloth 12 and then as shown in FIG. 29C, the second ends of each pair of the tether cloths 22 are sewn together to form the connecting portions 20 and 21. Then the inboard side panel 13 and outboard side panel 14 are overlapped and sewn together at the outer peripheral edges 13a and 14a, and the connecting portion 23 is formed by sewing together the panels 13 and 14 at a predetermined position. Thus the airbag 10F is completed.

In addition to the same advantages as the first embodiment, slippage of textile threads of the body cloth 12 is suppressed due to cushioning property of the coating composition CM penetrating into the body cloth 12 at the upper part 15a of the seam 15, and gas leak is prevented consequently. Since the coating composition CM applied to the upper part 15a of the seam 15 is not used to adhere together the outer peripheral edges 13a and 14a of the inboard and outboard side panels 13 and 14, the upper part 15a is not harden, and therefore gives nice touch upon contact with a vehicle occupant. It will also be appreciated that the coating composition CM is applied in a penetrating fashion as described above to the whole outer peripheral area 11a of the circumferential wall 11 to be sewn up to form the seam 15.

Figure 17:
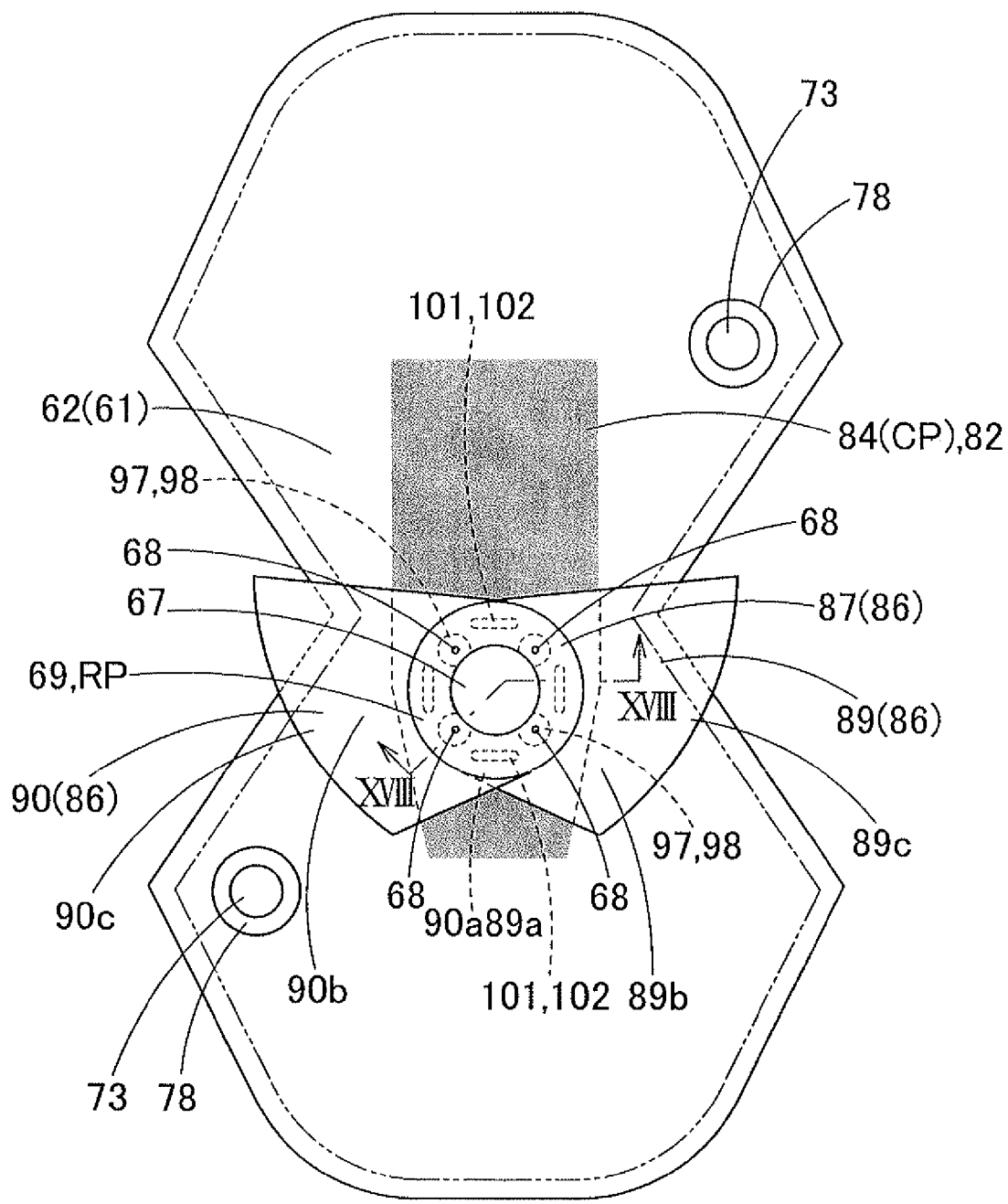
FIG. 17 is a plan view of the airbag of FIG. 9 during the production process in which the airbag has been subjected to drilling with all the supplementary cloths bonded to the body cloth.

Now the second embodiment of the invention is described. FIGS. 8 to 12 are illustrative of an airbag 60 of the second embodiment provided with a coating layer 82. As shown in FIGS. 10, 11 and 17, the coating layer 82 is provided to enhance heat resistance of the body cloth 62 exposed to hot inflation gas G and prevent scorching of the body cloth 62 due to the gas G.

Figure 8:
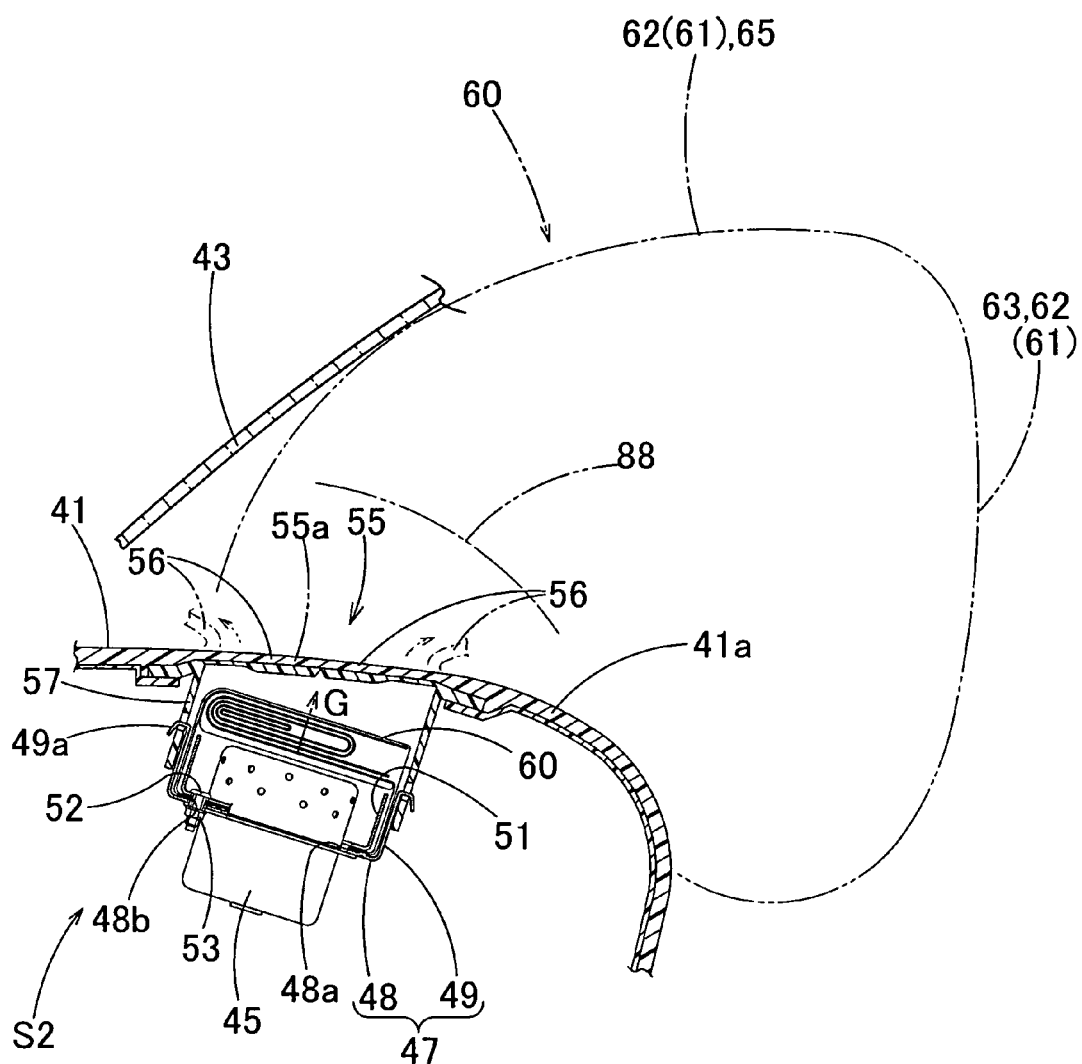
FIG. 8 is a schematic vertical section of an airbag apparatus for a front passenger's seat that employs an airbag according to the second embodiment of the invention as mounted on a vehicle.

As shown in FIG. 8, the airbag 60 is designed for use in an airbag apparatus S2 for a front passenger's seat. The airbag apparatus S2 is of "top mount" type that is mounted on an interior of a top plane 41a of an instrument panel or dashboard 41 in front of a front passenger's seat. The airbag apparatus S2 includes an airbag 60, an inflator 45 that supplies the airbag 60 with inflation gas, a case 47 that houses and holding the airbag 60 and the inflator 45, a retainer 51 that attaches the airbag 60 to the case 47, and an airbag cover 55 that covers the airbag 60.

The retainer 51 is made of sheet metal and square annular in shape, and is provided at four corners thereof with bolts 52 extending downward. The bolts 52 are passed through the mounting holes 68 (see FIGS. 17 and 18) of the airbag 60, and through a later-described bottom wall 48 of the case 47 and then fastened into nuts 53, and thus the retainer 51 is secured to the case 47.

The inflator 45 is generally columnar in shape and secured to the bottom wall 48 of the case 47 by the bolts 52 of the retainer 51 together with the airbag 60.

The airbag cover 55 is integral with the dashboard 4 and includes two doors 56 that open toward the front and rear when pushed by the airbag 60 upon airbag deployment. Around the doors 56 is a generally square tubuar side wall 57 that extends downward so as to be coupled with a later-described circumferential wall 49 of the case 47.

The case 47 is made of sheet metal and is formed into an open-top, generally rectangular parallelepiped box shape. The case 47 includes a bottom wall 48 having a rectangular plate shape to which the inflator 45 and airbag 60 are secured to and a circumferential wall 49 extending upwardly in a generally square tubular shape from the outer circumference of the bottom wall 48. The bottom wall 48 includes an insert hole 48a for receiving the inflator 45 from lower side and apertures 48b for receiving the bolts 52 of the retainer 51. The circumferential wall 49 is provided with hooks 49a for engagement with the side wall 57 of the airbag cover 55.

The case 47 further includes unillustrated brackets that are secured to the vehicle body structure. The airbag apparatus S2 is assembled with the vehicle by these brackets.

Figure 9:
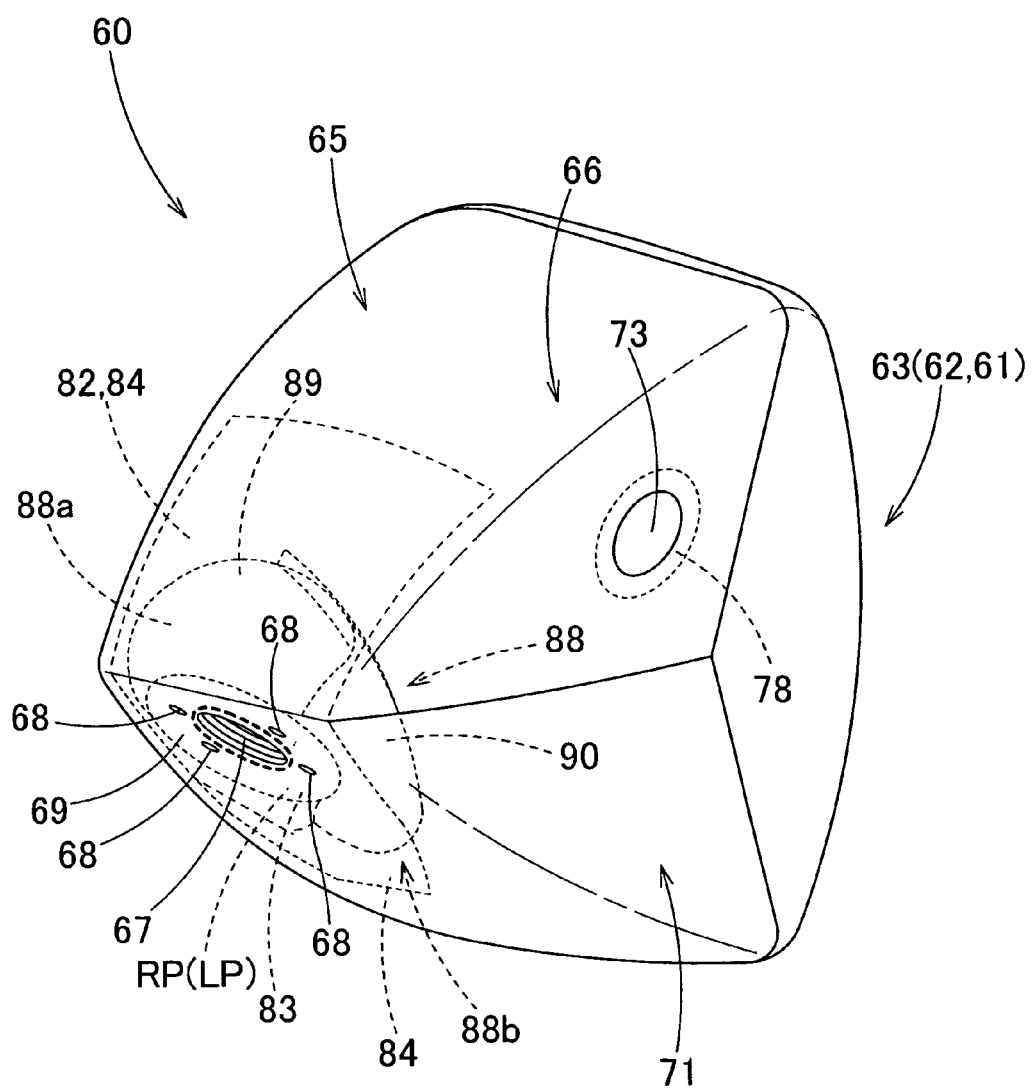
FIG. 9 is a perspective view of the airbag of the second embodiment as inflated by itself.
Figure 10:
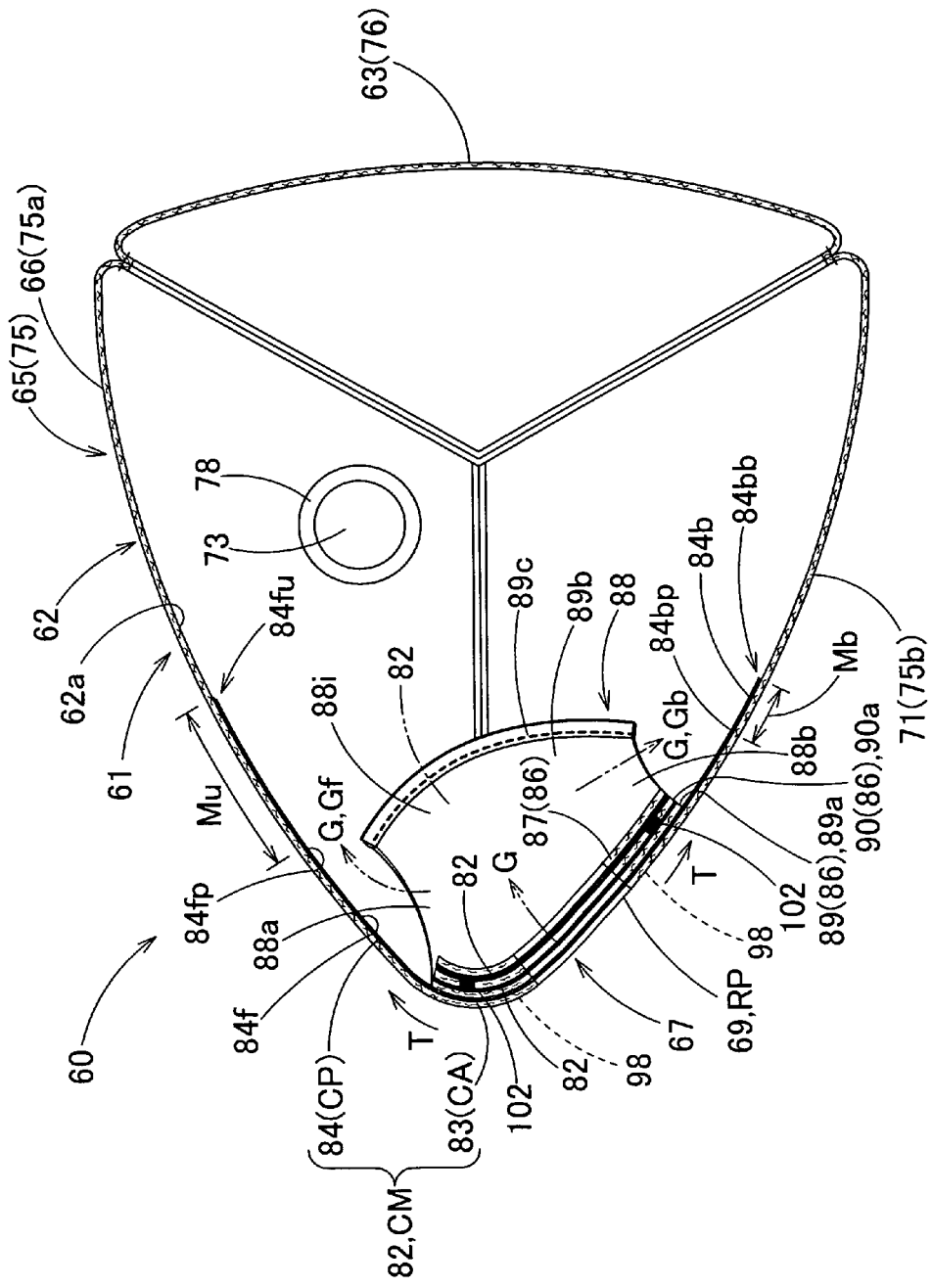
FIG. 10 is a sectional view of the airbag of FIG. 9 as inflated by itself taken along an anteroposterior direction.
Figure 11:
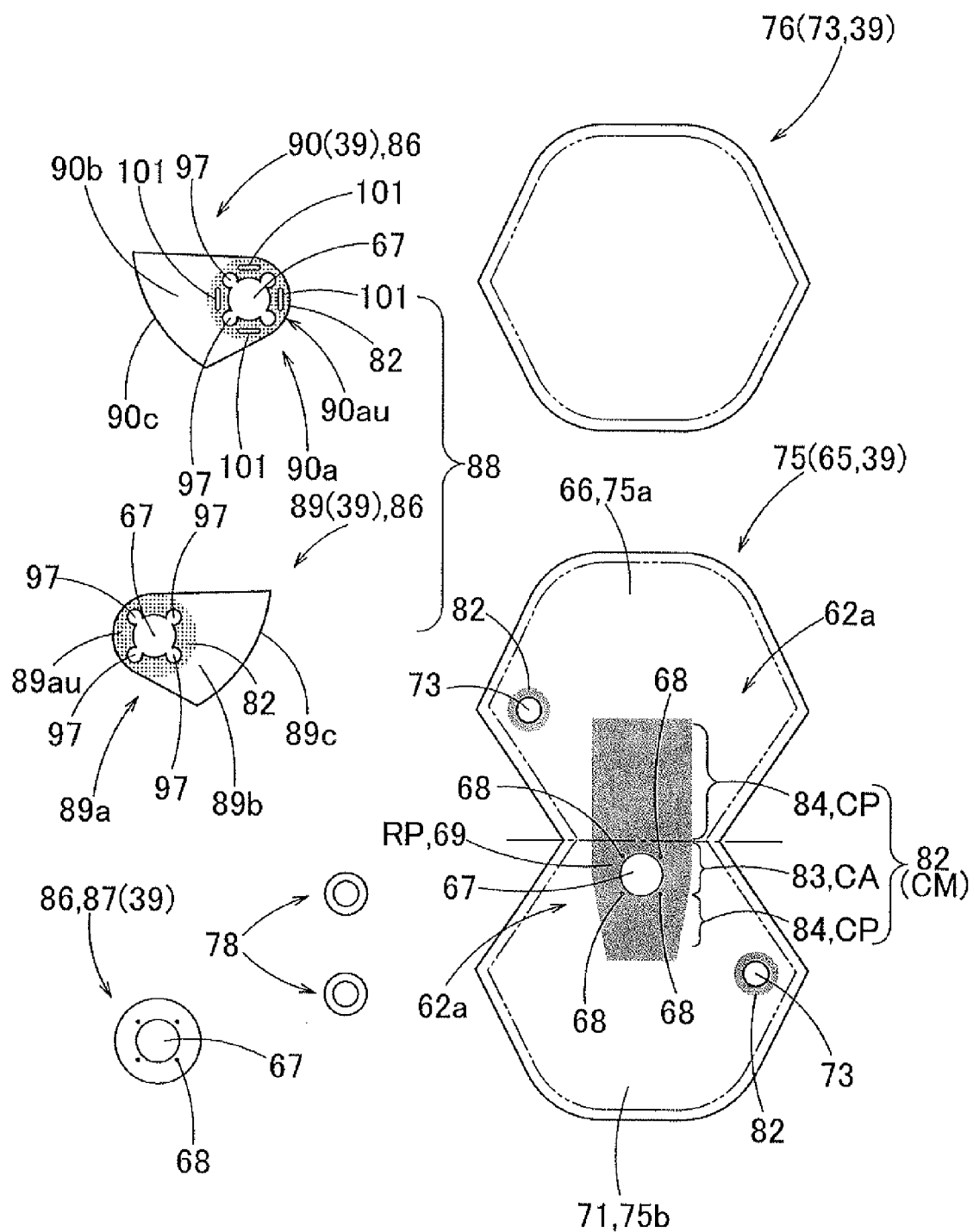
FIG. 11 illustrates components of the airbag of FIG. 9 by plan view.

Referring to FIGS. 8 to 10, the airbag 60 as deployed includes a restraint panel 63 arranged generally vertically facing toward a front passenger's seat and a vehicle body side panel 65 extending forward from the outer peripheral edge of the restraint panel 63 in a generally square conical, narrowing fashion. The vehicle body side panel 65 as deployed includes an upper region 66 which is a generally upper half circumferential region and a lower region 71 which is a generally lower half circumferential region. The lower region 71 of the vehicle body side panel 65 is provided at the front area with an inlet port 67 for receiving the inflator 45 and admitting inflation gas G (FIG. 10) into the airbag 60. Around the inlet port 67 are a plurality of (four, in the illustrated embodiment) mounting holes 68 for receiving the bolts 52 of the retainer 51, this area around the inlet port 67 acts as a mounting area 69 that mounts the airbag 60 to the bottom wall 48 of the case 47. The vehicle body side wall 65 includes on each of laterals a vent hole 73 that releases extra inflation gas.

As shown in FIGS. 9 and 10, the airbag 60 internally includes a redirecting cloth 88 that is formed into a tube arranged to cover the inlet port 67 and redirects and releases the inflation gas G forward and rearward from the front outlet 88a and rear outlet 88b. The redirecting cloth 88 is composed of two pieces of cloth members 89 and 90 (see FIGS. 11 and 17) which are generally bilaterally symmetric. The cloth members 89 and 90 are respectively connected to the peripheral area of the inlet port 67 by a generally round region (peripheral region) 89a/90a whereas their extended regions 89b and 90b extending outwardly from the peripheral regions 89a and 90a in a sectorial shape are coupled together by edges 89c and 90c, and thus formed into a tube.

Referring to FIGS. 9 to 11, the circumferential wall 61 of the airbag 60 is comprised of a body cloth 62 inflatable into a bag shape and three pieces of supplementary cloths 86 applied to the inner surface 62a of the body cloth 62 in a laminated manner. The supplementary cloths 86 are applied to the mounting area 69, i.e. the peripheral area of the inlet port 67, which requires reinforcement for counteracting a tensile force T upon airbag deployment. What constitute the three pieces of supplementary cloths 86 are the cloth members 89 and 90 described above as forms the redirecting cloth 88 and a reinforcing cloth 87. These three pieces of supplementary cloths 86 are bonded to the mounting area 69 of the body cloth 62, thus providing a reinforced area RP (which will also be called a laminated area. LP).

Figure 12:
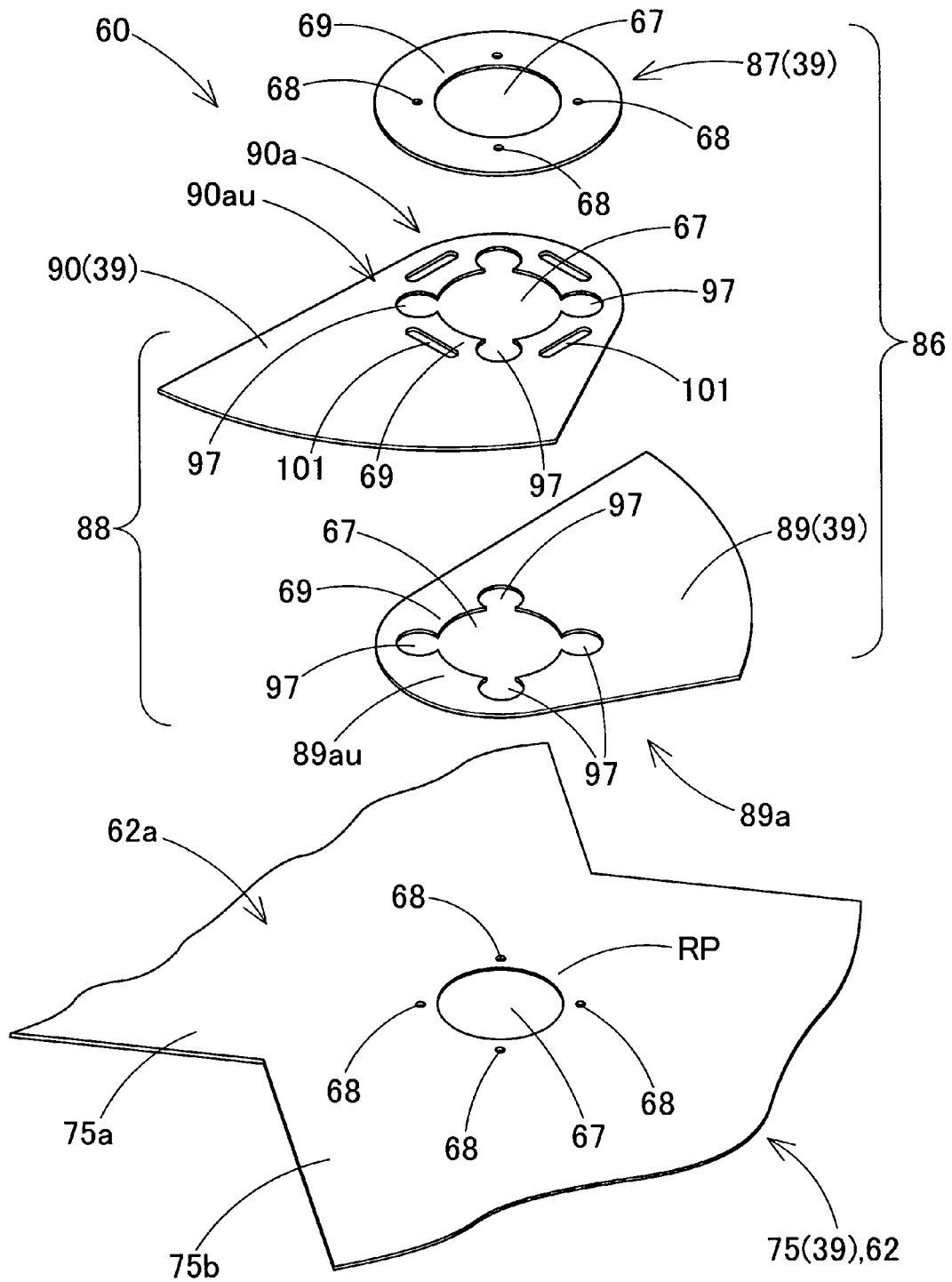
FIG. 12 is an exploded perspective view of a vicinity of a gas inlet port of the airbag of FIG. 9.

Briefly describing the bond structure of the body cloth 62 and supplementary cloths 86 by reference to FIGS. 11 and 12, out of the three sheets of the supplementary cloths 86 (i.e. the reinforcing cloth 87 and cloth members 89 and 90), the lowermost cloth 89 which immediately contacts the body cloth 62 is provided on each location of the mounting holes 68 of the airbag 60 and its periphery with a through hole 97 having a round shape. The middle cloth 90 is also provided on each location of the mounting holes 68 of the airbag 60 and its periphery with a through hole 97 having a round shape. The middle cloth 90 further includes in between the through holes 97 second through holes 101 each having an oblong shape, in radial arrangement about the inlet port 67 of the airbag 60.

FIGS. 11 and 12 are exploded views of the finished airbag 60. When just cut out from a material fabric 39, the body cloth 62 and supplementary cloths 86 are not yet provided with the inlet port 67 or mounting holes 68 but has only the through holes 97 and 101.

Figure 18:
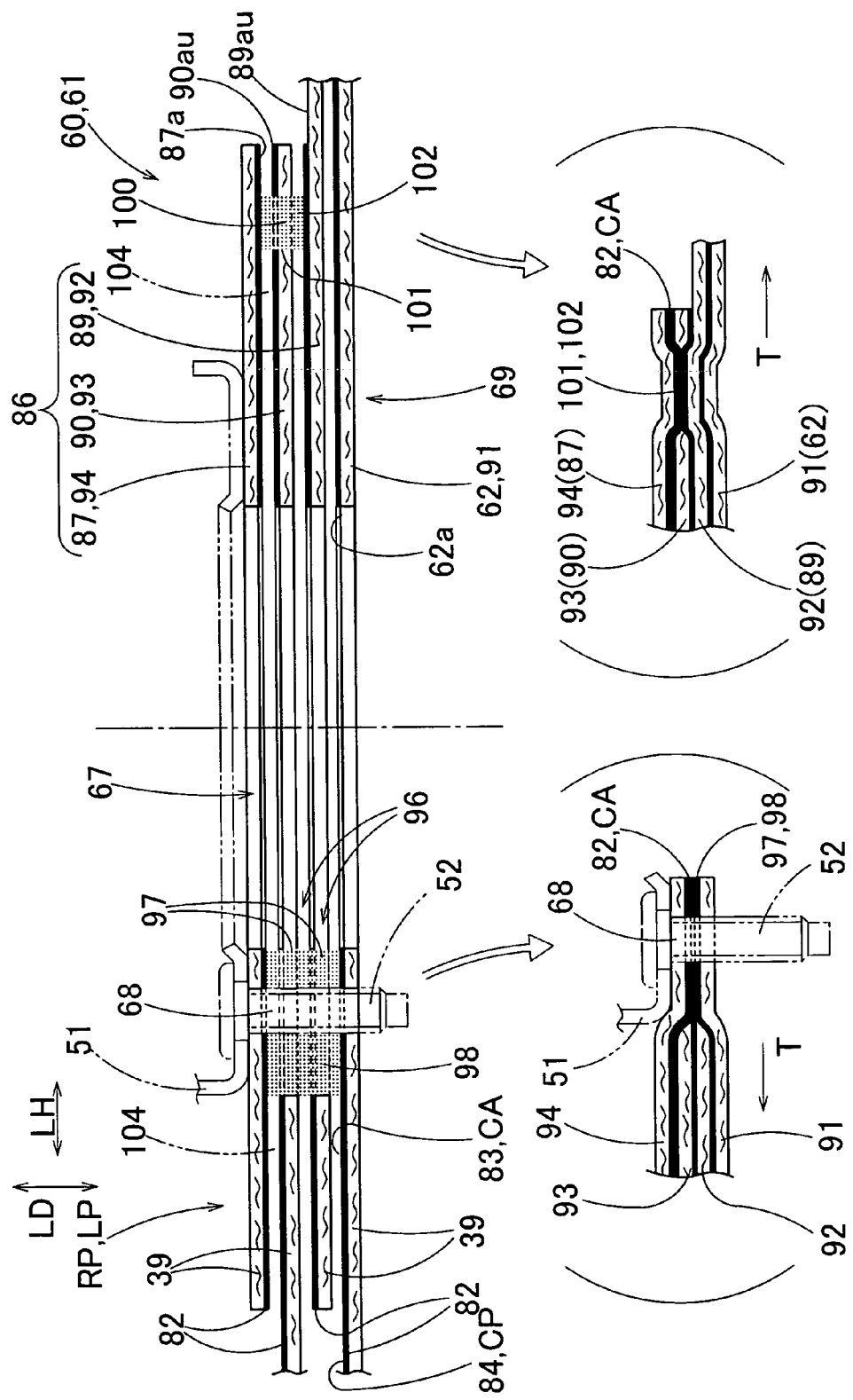
FIG. 18 is a vertical section taken along line XVIII-XVIII of FIG. 17.

As shown in FIGS. 11, 13 to 17, a coating layer 82 utilizable as an adhesive CA is formed respectively on an inner surface 62a of the body cloth 62, on top faces 89au, 90au of the peripheral regions 89a and 90a of the cloth members 89 and 90, and on a bottom face 87 of the reinforcing cloth 87. By heat sealing the coating layers 82 of those cloth members, the body cloth 62 and the reinforcing cloth 87 are adhered together at the locations of the through holes 97, providing adhered regions 98 (FIG. 18) whereas the reinforcing cloth 87 and cloth member 89 are adhered together at the locations of the through holes 101, providing adhered regions 102 (FIG. 18). Although the cloth member 90 is not bonded to any of other cloth members 62, 89 and 87, the adhered regions 98 and 102 formed on the locations of the through holes 97 and 101 bond all the cloth members 62, 87, 89 and 90 together and prevents the cloth members 62, 87, 89 and 90 from slipping from one another in a direction LH orthogonal to the layering direction LD (FIG. 18).

Referring back to FIGS. 10 and 11, the body cloth 62 is composed of a first base cloth 75 and a second base cloth 76 sewn together. The first base cloth 75 is formed into such a shape that two generally equilateral hexagons (an upper region 75a and lower region 75b) are coupled together and is constricted in the middle in a vertical direction. The second base cloth 76 is formed into a generally equilateral hexagon. The base cloths 75 and 76 are designed to form a three-dimensional circumferential wall 61 of the airbag 60 by planar sewing work. The second base cloth 76 forms a generally entire area of the restraint panel 63 of the airbag 60 whereas the first base cloth 75 forms a generally entire area of the vehicle body side panel 65. The upper region 75a of the first base cloth 75 forms a generally entire area of the upper region 66 of the vehicle body side panel 65 whereas the lower region 75b forms a generally entire area of the lower region 71 of the vehicle body side panel 65.

The base cloths 75 and 76, reinforcing cloth 87 and cloth members 89 and 90 forming the redirecting cloth 88 are cut out into specific shapes from the material fabric 39 as in the first embodiment. As described above, the fabric 39 is a plain-weave fabric of polyamide yarn made of polyamide fiber.

As shown in FIGS. 9 to 11, the body cloth 62 is provided with a coating layer 82 from the vicinity of the rear outlet 88b to the vicinity of the front outlet 88a of the redirecting cloth 88 in the vicinity of the inlet port 67, which is the extended area 84 of this embodiment. The coating layer 82 acts as a protective membrane CP for preventing gas leak on this area exposed to hot inflation gas. Specifically, the protective membrane CP protects the extended area 34 from tacky mist droplets contained in the inflation gas G that would otherwise scorch the body cloth 62.

Figure 13:
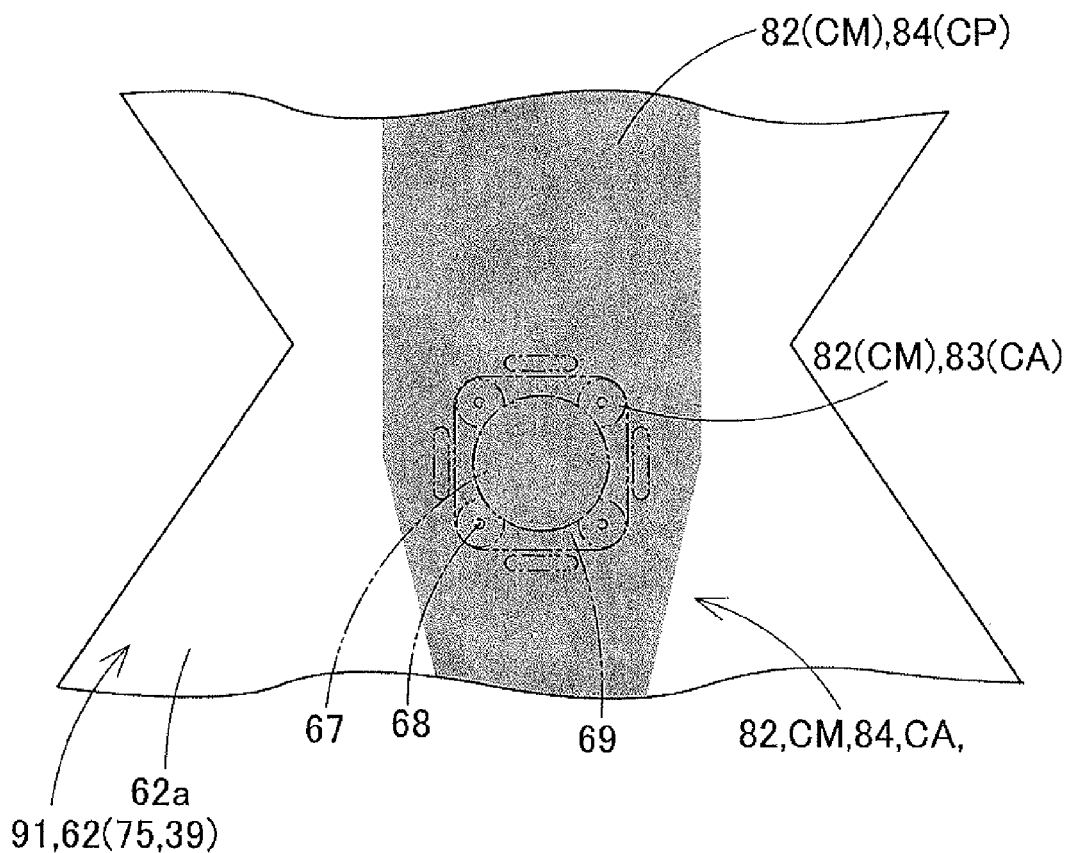
FIG. 13 is a partial enlarged plan view of a body cloth of the airbag of FIG. 9.
Figure 14:
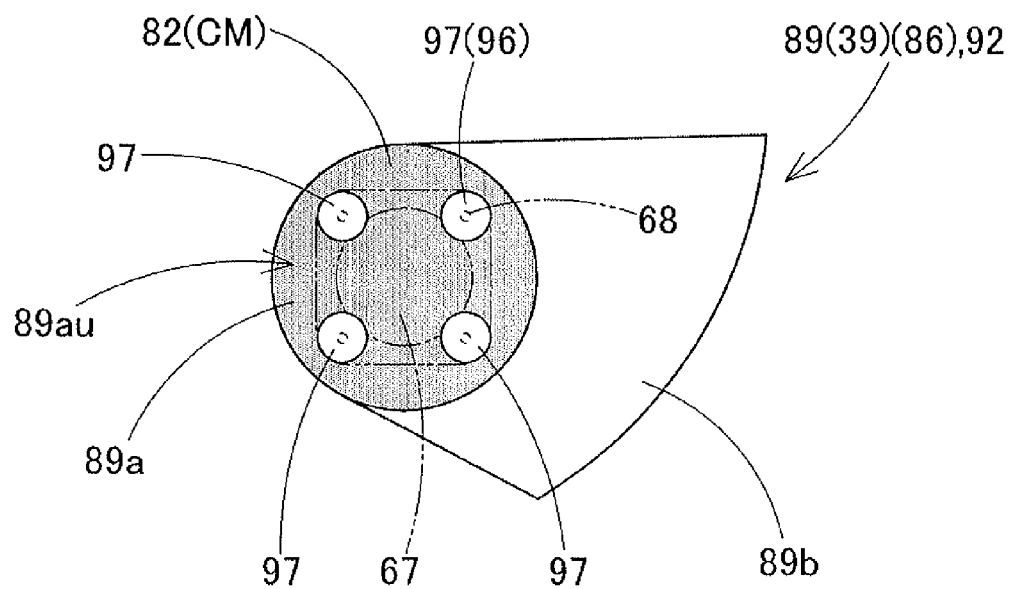
FIG. 14 is a plan view of a supplementary cloth of the airbag of FIG. 9.
Figure 15:
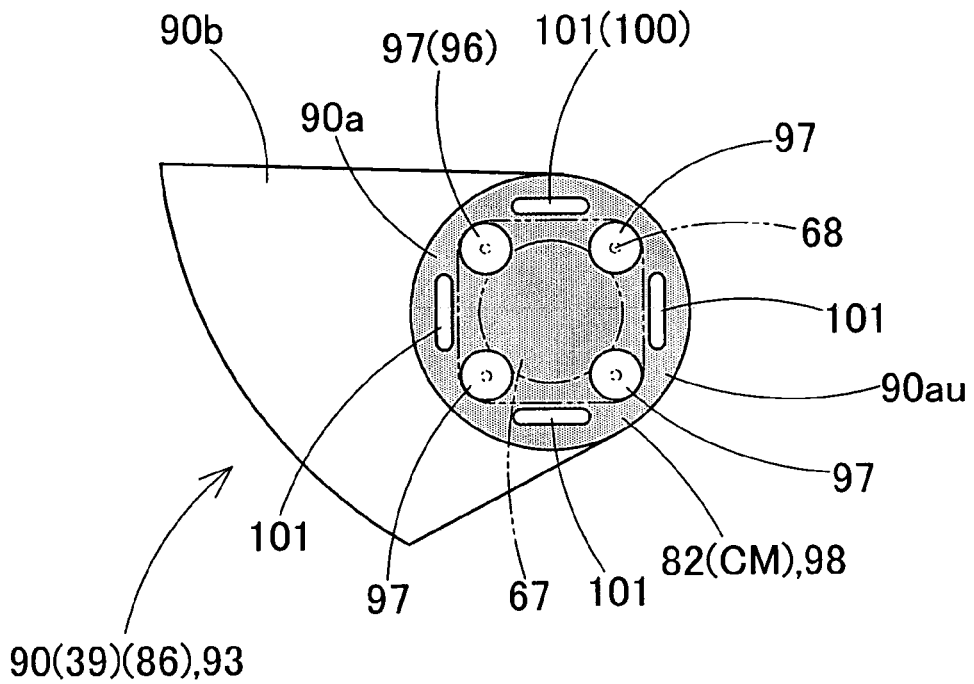
FIG. 15 is a plan view of another supplementary cloth of the airbag of FIG. 9.
Figure 16:
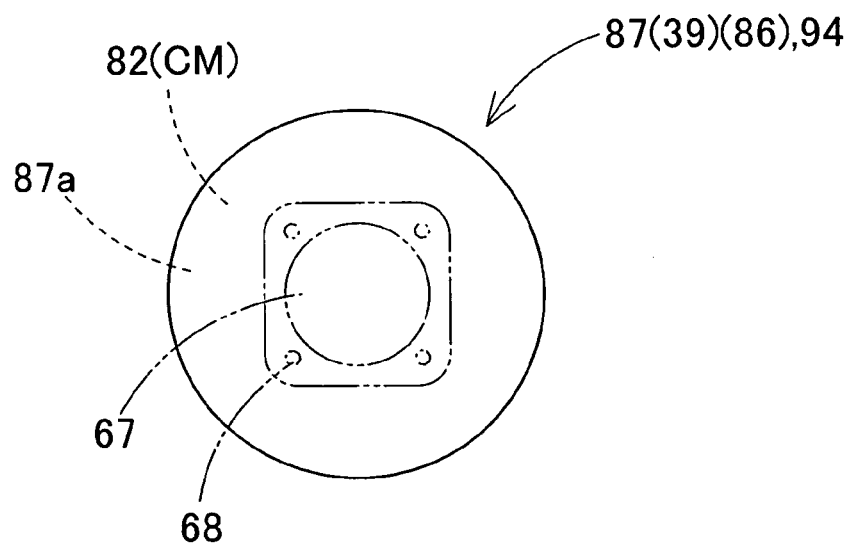
FIG. 16 is a plan view of yet another supplementary cloth of the airbag of FIG. 9.

Needless to say, as shown in FIGS. 10, 11 and 13, the coating layer 82 is also formed on the area around the inlet port 67 to which the reinforcing cloth 87 and cloth members 89 and 90 are bonded, i.e., on the bond area 83, where the coating layer 82 acts as the adhesive CA that heat-seals the cloths 87, 89 and 90 to the body cloth 62. That is, the coating layer 82 is formed on a small, vertically long rectangular area, including the bond area 83 and extended area 34, from the vicinity of the front outlet 88a to the vicinity of the rear outlet 88b of the redirecting cloth 88, leaving the remaining area uncoated.

Figure 30:
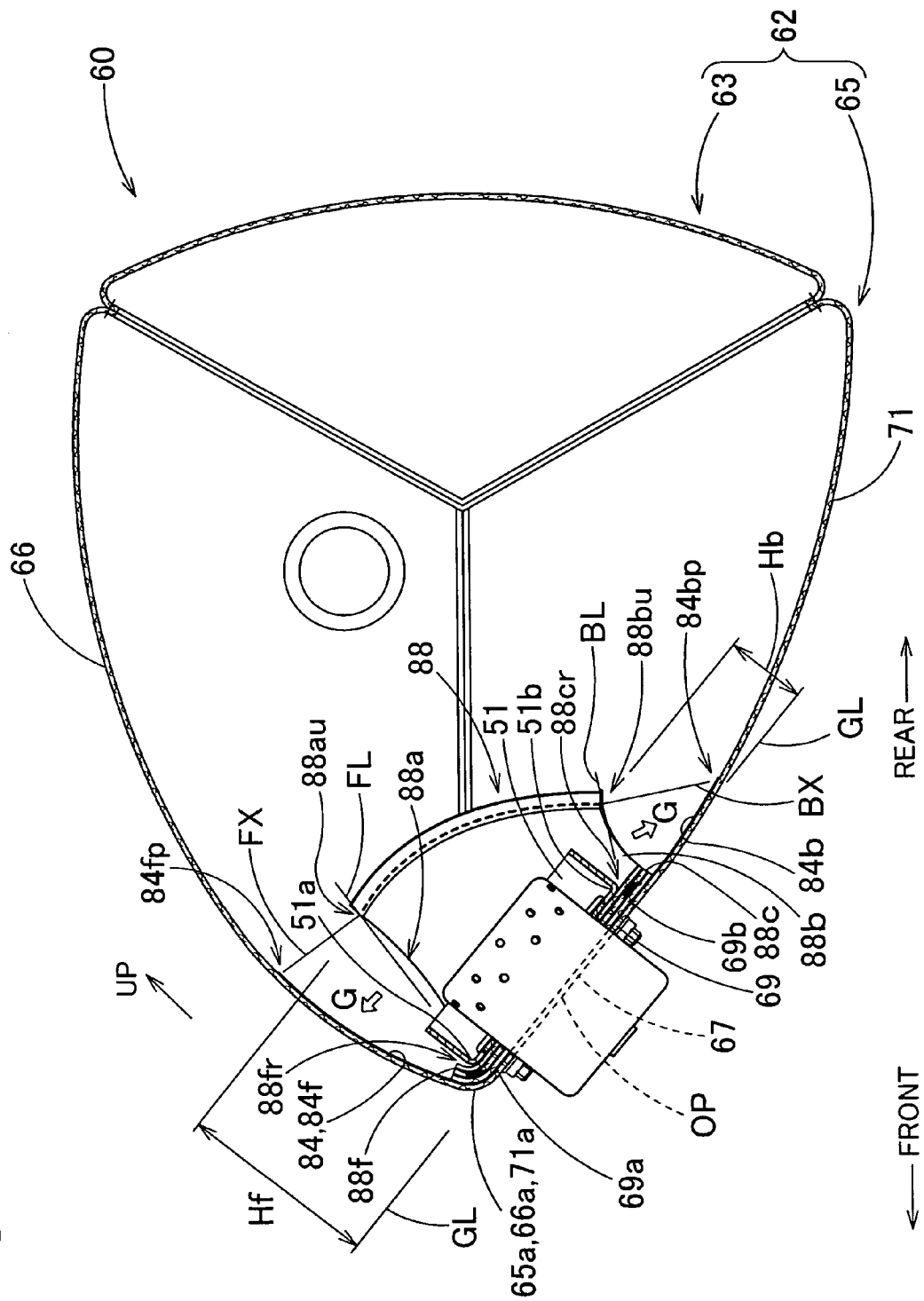
FIG. 30 illustrates the boundary of the extended area in the airbag of FIG. 9.

Since the extended area 84 is determined by the configuration of the redirecting cloth 88, the redirecting cloth 88 is now described more specifically. As shown in FIG. 30, the redirecting cloth 88 is formed into a tube extending in an anteroposterior direction, having a round opening shape and in which the front outlet 88a has a greater opening area than the rear outlet 88b. The redirecting cloth 88 is secured to the bottom wall 48 of the case 47 by the retainer 51 together with the peripheral area of the inlet port 67 of the body cloth 62 (FIG. 8). As shown in FIG. 30, in a vertical, anteroposterior sectional view of the airbag 60 as secured to the case 47 and fully inflated by itself, with respect to the height from the base line GL that extends along the opening plane OP of the inlet port 67, the height Hf at the upper edge 88au of the front outlet 88a is greater than the height Hb at the upper edge 88bu of the rear outlet 88b. Further, the upper edge 88bu of the rear outlet 88b is located at the rear relative to the rear edge 88c of the portion of the redirecting cloth 88 held down by, the retainer 51.

The extended area 84 is determined in relation to inflation gas G that exits the front and rear outlets 88a and 88b of the redirecting cloth 88 constructed as above straightly toward a direction generally orthogonal to the opening planes of the outlets 88*a* and 88*b*. That is, since inflation gas G exits the outlets 88*a* and 88*b* of the redirecting cloth 88 in an anteroposterior direction, the extended area 84 is determined by such inflation gas G in a vertical, anteroposterior sectional view of the airbag 60 as secured to the case 47 and fully inflated by itself like in FIG. 30.

With respect to the front area 84*f* of the extended area 84, firstly, in front of the front outlet 88*a* is the upper region 66 of the vehicle body side panel 65 extending upward from the top 65*a* of the generally square cylindrical vehicle body side panel 65. The front area 84*f* of the extended area 84 is required to be so located as to extend upward on the upper region 66 of the vehicle body side panel 65 from the front edge 88*f* of the redirecting cloth 88 at the vicinity of the front periphery 69*a* of the mounting area 69. In the illustrated embodiment, the front area 84*f* is so located as to extend upward on the upper region 66 from the front end 71*a* of the lower region 71 of the vehicle body side panel 65 (i.e. from the lower end 66*a* of the upper region 66). Further, the upper boundary point 84*fp*, which determines the minimum area of the front area 84*f* of the extended area 84, is determined by inflation gas G that exits the vicinity of the upper edge 88*au* of the front outlet 88*a* towards a direction generally orthogonal to the opening plane of the front outlet 88*a*. Connecting the point 88*fr* on the redirecting cloth 88 immediately below the front end 51*a* of the retainer 51 and the upper edge 88*au* of the front outlet 88*a* provides a front vertical straight line FL which corresponds to the opening plane of the front outlet 88*a*, and further drawing a straight line forward from the upper edge 88*au* of the front outlet 88*a* perpendicularly to the line FL provides a front perpendicular line FX. The upper boundary point 84*fp* is defined by an intersecting point of the front perpendicular line FX and the upper region 66. Actual upper end 84*fu* of the extended area 84 must be located above the upper boundary point 84*fp*, by way of example as the airbag 60 shown in FIG. 10. The actual upper end 84*fu* is desirably located as close to the upper boundary point 84*fp* as possible from the viewpoint of lightening of the airbag 60. The length Mu from the upper boundary point 84*fp* to the actual upper end 84*fu* in the airbag 60 is about 130 mm, with an ample allowance.

With respect to the rear area 84*b* of the extended area 84, since the rear outlet 88*b* is oriented obliquely rearward and downward, the rear area 84*b* is required to be located on a rear area of the rear edge 88*c* of the redirecting cloth 88 proximate the rear edge 69*b* of the mounting area 69 in the peripheral area of the inlet port 67 of the body cloth 62, on the lower region 71 of the vehicle body side panel 65. Further, the rear boundary point 84*bp*, which determines the minimum area of the rear area 84*b* of the extended area 84, is determined by inflation gas G that exits the vicinity of the upper edge 88*bu* of the rear outlet 88*b* towards a direction generally perpendicular to the opening plane of the rear outlet 88*b*. Connecting the point 88*cr* on the redirecting cloth 88 immediately below the rear end 51*b* of the retainer 51 and the upper edge 88*bu* of the rear outlet 88*b* provides a rear vertical straight line BL which corresponds to the opening plane of the rear outlet 88*b*, and further drawing a straight line rearward from the upper edge 88*bu* of the rear outlet 88*b* perpendicularly to the line BL provides a rear perpendicular line BX. The rear boundary point 84*bp* is defined by an intersecting point of the rear perpendicular line BX and the lower region 71. Actual rear end 84*bb* of the extended area 84 must be located at the rear of the rear boundary point 84*bp*, by way of example as the airbag 60 shown in FIG. 10. The actual rear end 84*bb* is desirably located as close to the rear boundary point 84*bp* as possible from the viewpoint of lightening of the airbag 60. The length Mb from the rear boundary point 84*bp* to the actual rear end 84*bb* in the airbag 60 is about 40 mm, with an allowance.

With this configuration, the extended area 84 provided with the coating layer 82 receives a major part of the inflation gas G flowing out of the front outlet 88*a* straightly and of the gas G flowing out of the rear outlet 88*b* straightly, and therefore, such scorching as forms a hole due to inflation gas G is prevented both on the extended area 84 and remaining uncoated area of the body cloth 62.

Figure 31:
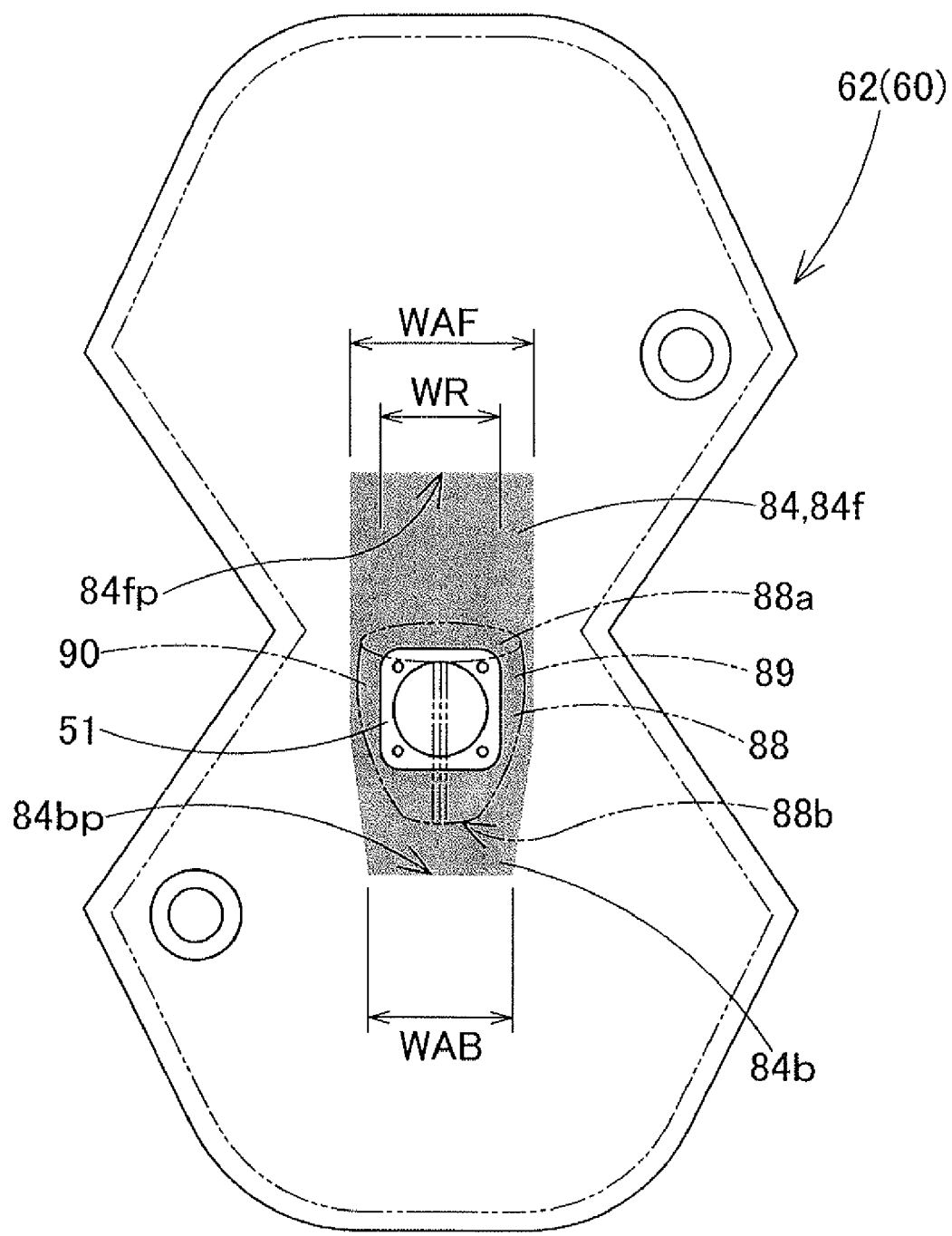
FIG. 31 is a plan view of the vicinity of the gas inlet port of the airbag of FIG. 30, which illustrates the boundary of the extended area.

With respect to the dimension of the extended area 84 in a left and right direction, referring to FIG. 31, since the front outlet 88*a* of the redirecting cloth 88 is greater in opening area than the rear outlet 88*b*, the width WAF in a left and right direction of the front area 84*f* of the extended area 84 is configured wider than the width WR of the retainer 51 by about 20 to 50 percent whereas the width WAB of the rear area 84*b* is configured wider than the width WR of the retainer 51 by about 10 to 25 percent.

The coating layer 82 in the second embodiment is identical to the coating layer 32 of the first embodiment.

Manufacturing of the airbag 60 of the second embodiment is now described. Firstly, the first base cloth 75, second base cloth 76 of the body cloth 62, the reinforcing cloth 87 and cloth members 89 and 90 of the redirecting cloth 88 are cut out from the fabric 39. Then the coating composition CM is applied to the bond area 83 and extended area 84 of the first base cloth 75, the reinforcing cloth 87 and the locations of the mounting area 69 on the cloth members 89 and 90 to provide the coating layer 82 as shown in FIGS. 13 to 16. Thus provided are a component cloth 91 (body cloth 62), a component cloth 92 (cloth member 89), a component cloth 93 (cloth member 90) and a component cloth 94 (reinforcing cloth 87). Then these component cloths 91, 92, 93 and 94 are bonded together. Specifically, the body cloth 62 (component cloth 91) is laid on a support bed of a heat press machine with the coating layer 82 located on the top surface (which is to be the inner surface) 62*a*, and the cloth member 89 (component cloth 92) is placed over the body cloth 62 with the coating layer 82 located on the top surface 89*au*. Subsequently, the cloth member 90 (component cloth 93) with the coating layer 82 located on the top surface 90*au* is placed on the cloth member 89 and further the reinforcing cloth 87 (component cloth 94) is placed over the cloth member 90 with the coating layer 82 located on the underside 87*a* (refer to FIG. 18). Depressing a heating plate of the heat press machine, locations of the through holes 97 (namely, no-cloth areas 96 where there are no cloth members 89 and 90) and locations of the through holes 101 (namely, no-cloth areas 100 where there is no cloth member 90) are heated under pressure, thus providing adhesion areas 98 at the no-cloth areas 96 where the coating layers 82 of the body cloth 62 (component cloth 91) and reinforcing cloth 87 (component cloth 94) are bonded together and adhesion areas 102 at the no-cloth areas 100 where the coating layers 82 of the cloth member 89 (component cloth 92) and the reinforcing cloth 87 (component cloth 94) are bonded together (FIGS. 17 and 18).

Thereafter, as shown in FIGS. 17 and 18, the inlet port 67 and mounting holes 68 are formed on the reinforced area RP (or laminated area LP). Then the edges 89*c* and 90*c* of the extended regions 89*b* and 90*b* of the cloth members 89 and 90 are sewn together to form the redirecting cloth 88. At this time, a reinforcing patch 78 is bonded to the periphery of each of the vent holes 73 on the inner surface 62*a* (FIGS. 11 and 17). Such a reinforcing patch 78 may be bonded to the body cloth 62 by sewing, or by adhesion utilizing a coating layer 82 formed on the body cloth 62.

Subsequently, the first base cloth 75 is doubled up at the boundary of the upper region 75a and lower region 75b and lateral edges of the upper region 75a and lower region 75b proximate the inlet port 67 are sewn together. Then the first base cloth 75 is opened by unsewn peripheral edges, and sewn together with the second base cloth 76 by those peripheral edges. Thus the airbag 60 is formed into a bag shape. Thereafter, the airbag 60 is reversed inside out from the inlet port 67 such that seam allowances may not be exposed to outside. Thus the airbag 60 is completed.

Mounting of the airbag 60 on the vehicle is now described. Firstly, the retainer 51 is housed inside the airbag 60 such that the bolts 52 project out of the mounting holes 68 of the airbag 60, and then the airbag 60 is folded up in that state. The folded-up airbag 60 is wrapped up by an unillustrated wrapping sheet for keeping the folded-up configuration.

Thereafter, the airbag 60 is set in the case 47 such that the bolts 52 of the retainer 51 project out of the bottom wall 48 of the case 47. Then the inflator 45 is inserted into the airbag 60 through the insert hole 48a of the case 47 and the inlet port 67 of the airbag 60. If then the nuts 53 are fastened with the bolts 52, the airbag 60 and inflator 45 are secured to the bottom wall 48 of the case 47.

Subsequently, the case 47 is assembled with the airbag cover 55 by having the hooks 49a of the circumferential wall 49 of the case 47 engaged with the side wall 57 of the airbag cover 55, and thus completing the airbag apparatus S2. The airbag apparatus S2 is then mounted on the vehicle by securing unillustrated brackets of the dashboard 41 and case 47 to the vehicle body structure.

If inflation gas G is discharged from the inflator 45 after the airbag apparatus S2 is mounted on the vehicle, the airbag 60 unfolds and inflates, while breaking the wrapping sheet and pushing and opening the doors 56 of the airbag cover 55 as shown in FIG. 8. Then the airbag 60 emerges from the opening 55a provided by the opening of the doors 56 and deploys upward and rearward in such a manner as to fill up a space between the top plane 41a of the dashboard 41 and the windshield 43.

In the airbag 60 according to the second embodiment, as shown in FIGS. 9 and 10, the extended area 84 having the coating layer 82 is located on the area proximate the gas inlet port 67 which is to be subjected to hot mist of inflation gas G. The coating layer 82 prevents mist droplets from scorching and holing the body cloth 62 which would otherwise cause gas leak. Specifically, the coating layer 82 prevents heat transfer from such mist droplets in the event that droplets adhere to the extended area 84. Further, if such droplets once contact the extended area 84 and then are blown off toward the uncoated area of the body cloth 62, scorching will be prevented as well since the extended area 84 has drawn heat from the droplets upon contact.

Especially, in the second embodiment, the extended area 84 is located in the vicinity of the front outlet 88a and rear outlet 88b of the redirecting cloth 88 that redirects inflation gas G toward the front and rear. Such extended area 84 catches mist droplets of inflation gas G by itself or draws their heat when inflation gas G flows out of the front and rear outlets 88a and 88b. As a result, the body cloth 62, both on the extended area 84 and on the remaining uncoated area, is prevented from scorching due to inflation gas G. Thus the airbag 60 unfolds widely in a vertical direction by the redirected inflation gas G without protruding partially rearward, and restrains an occupant M by the unfurled restraint panel 63 without giving a partial pressure to the occupant M.

In the second embodiment, moreover, as shown in FIG. 10, the front area 84f of the extended area 84 is determined to include, or to extend beyond, the upper boundary point 84fp which is the upper end of inflation gas G that flows out of the front outlet 88a of the redirecting cloth 88 perpendicularly to the opening plane of the front outlet 88a whereas the rear area 84b of the extended area 84 is determined to include, or to extend beyond, the rear boundary point 84bp which is the rear end of inflation gas G that flows out of the rear outlet 88b of the redirecting cloth 88 perpendicularly to the opening plane of the rear outlet 88b. The front area 84f and rear area 84b of the extended area 84 thus formed receive a major part of inflation gas G (Gf) flowing out of the front outlet 88a straightly and of inflation gas G (Gb) flowing out of the rear outlet 88b straightly, and therefore, such scorching as forms a hole due to inflation gas G is prevented both on the extended area 84 and the remaining uncoated area of the body cloth 62.

For further preventing scorching of the body cloth 62, it will also be appreciated that the cloth members 89 and 90 are coated by the coating composition CM not only on the peripheral regions 89a and 90a but also on the extended regions 89b and 90b such that the redirecting cloth 88 has the coating layer 82 all over the inner surfaces 88i as indicated by a double-dashed line in FIG. 10.

Also in the second embodiment, the coating layers 82 on the bond area 83 of the body cloth 62 and the underside of 87a of the reinforcing cloth 87 are used as the adhesive CA bonding the reinforcing cloth 87 to the body cloth 62, such that no sewing work is required to bond the reinforcing cloth 87 to the body cloth 62, and thus simplifying the bonding work. Further, since the coating layer 82 on the bond area 83 and extended area 84 are made from the same material, work efficiency in manufacturing the airbag 60 having countermeasures against gas leakage is improved while reducing manufacturing cost thereof.

Moreover, the configuration that the coating layer 82 is not formed all over the body cloth 62 but formed only on part of the body cloth 62, i.e. on the bond area 83 to which the reinforcing cloth 87 is bonded and on the extended area 84 which is desired to be leak resistant is conducive to weight reduction of the airbag 60. On the other hand, since the fabric 39 forming the body cloth 62 and supplementary cloths 86 (reinforcing cloth 87 and cloth members 89 and 90) and the coating layer 82 are made from the same type of material (polyamide), the airbag 60 can be used as recycled material of polyamide easily after processes of cutting and meltdown.

Therefore, the airbag 60 of the second embodiment is light in weight, cost saving, easy to manufacture and recyclable although provided with means for preventing gas leakage.

Although the component cloths 91, 92, 93 and 94 of the airbag 60 are provided with the coating layer 82 after being cut out from the fabric 39, the coating layer 82 may also be applied to predetermined areas of the fabric 39 before cutting out the component cloths.

The airbag 60 of the second embodiment, as shown in FIG. 18, includes at the no-cloth areas 96 and 100 the adhesion areas 98 of the base cloths 91 and 94 and the adhesion areas 102 of the base cloths 92 and 94 that help keep all the component cloths 91, 92, 93 and 94 bonded together without slippage from one another in the reinforced area RP.

Specifically, referring to FIG. 18, the adhesion areas 98 where the component cloth 94 (reinforcing cloth 87) is directly bonded to the component cloth 91 (body cloth 62) at the no-cloth areas 96 prevent the component cloth 94 from slipping from the component cloth 91 in the direction LH orthogonal to the layering direction LD. The component cloths 94 and 92 (reinforcing cloth 87 and cloth member 89) are bonded together at the adhesion areas 102 formed at the no-cloth areas 100 where there is no cloth 93. That is, the component cloth 92 is indirectly bonded to the component cloth 91 via the component cloth 94. In the component cloth 92, the adhesion areas 98 position the peripheries of the through holes 97 and thus preventing the component cloth 92 from slipping from the component cloth 91 in the direction LH orthogonal to the layering direction LD as well as bonding the component cloth 92 indirectly to the component cloth 91. In the component cloth 93, the adhesion areas 102 position the peripheries of the through holes 101 as well as the adhesion areas 98 limit the positions of peripheries of the through holes 97 and thus preventing the component cloth 93 from slipping from the component cloth 91 in the direction LH orthogonal to the layering direction LD.

That is, all the supplementary cloths 86 (component cloths 92, 93 and 94) are bonded to the body cloth 62 (component cloth 91) without slippage in the direction LH orthogonal to the layering direction LD and bonded in close contact with one another. This configuration makes it easy to insert the bolts 52 of the retainer 51 into the mounting holes 68 of the body cloth 62 via the supplementary cloths 86, and thus improving handleability of the airbag 60.

Since the body cloth 62 and all the supplementary cloths 86 are bonded together without slippage, in other words all the supplementary cloths 86 are directly or indirectly bonded to the body cloth 62, a tensile force T that acts on the body cloth 62 at airbag inflation will be distributed among the supplementary cloths 86, and thus enhancing the tensile strength of the body cloth 62.

At the bonding work during manufacturing of the airbag 60, if heat sealing the coating layers 82 of the component cloths 91 and 94 face to face at the no-cloth areas 96 and heat sealing the coating layers 82 of the component cloths 92 and 94 face to face at the no-cloth areas 100, the pairs of the component cloths 91, 92 and 92, 94 are bonded together and all the component cloths 91, 92, 93 and 94 are bonded together without sewing or the like although the component cloths 91, 92, 93 and 94 each has the coating layer 26 only on one side.

The inlet port 97 and mounting holes 68 are formed on the reinforced area RP by laser cutting or the like after bonding all the component cloths 91, 92, 93 and 94 at the adhesion areas 98 and 102. Since the component cloths 91, 92, 93 and 94 are prevented from slipping from one another, the inlet port 97 and mounting holes 68 are formed smoothly at desired positions.

Therefore, although including a laminated structure of four sheets of the component cloths 91, 92, 93 and 94 on the reinforced area RP, the airbag 60 of the second embodiment is readily manufactured and secures a good handleability.

In the airbag 60 of the second embodiment, furthermore, the laminated area LP includes the inlet port 67 for admitting inflation gas G and the mounting holes 68 arranged radially about and in the periphery of the inlet port 67. Further, the laminated area LP is held down on the bottom wall 48 of the case 47 by the retainer 51 that is annular in shape and includes the bolts 52 (or mounting means) to be inserted into the mounting holes 68. The adhesion areas 98 of the component cloths 91 and 94 falls upon the area of the retainer 51 in a view projected along the layering direction LD of the laminated area LP, that is, upon the area directly held down by the retainer 52 and are located at a plurality of positions (four positions, in the illustrated embodiment) radially about the inlet port 67. With this configuration, when the retainer 51 holds down the stiff adhesion areas 98 onto the bottom wall 48 of the case 47, the adhesion areas 98 encircling the inlet port 67 are coupled in a monolithic manner, thus enhancing the bond strength of not only the reinforcing cloth 87 but also the cloth members 89 and 90 interposed between the reinforcing cloth 87 and body cloth 62 against the body cloth 62, and further enhancing tensile strength that counteracts the tensile force T acting on the body cloth 62.

In the airbag 60, when forming the adhesion areas 98 and 102, an additional adhesion area 104 (refer to double-dashed lines in FIG. 18) may also be formed by bonding together the coating layers 82 on a whole area of the underside 87a of the reinforcing cloth 87 and on a whole area of the top surface 90a of the peripheral region 90a of the cloth member 90 by using such a heating plate of heat press that has an identical contour to the reinforcing cloth 87, for example. With this configuration, the component cloths 93 and 94 (the cloth member 90 and reinforcing cloth 87) are directly bonded together without any other cloth in between, such that the adhesion areas 98 are bonded in a monolithic manner together with the adhesion area 104 and the retainer 51, thus enhancing the tensile strength that counteracts the tensile force T acting on the body cloth 62.

Figure 19:
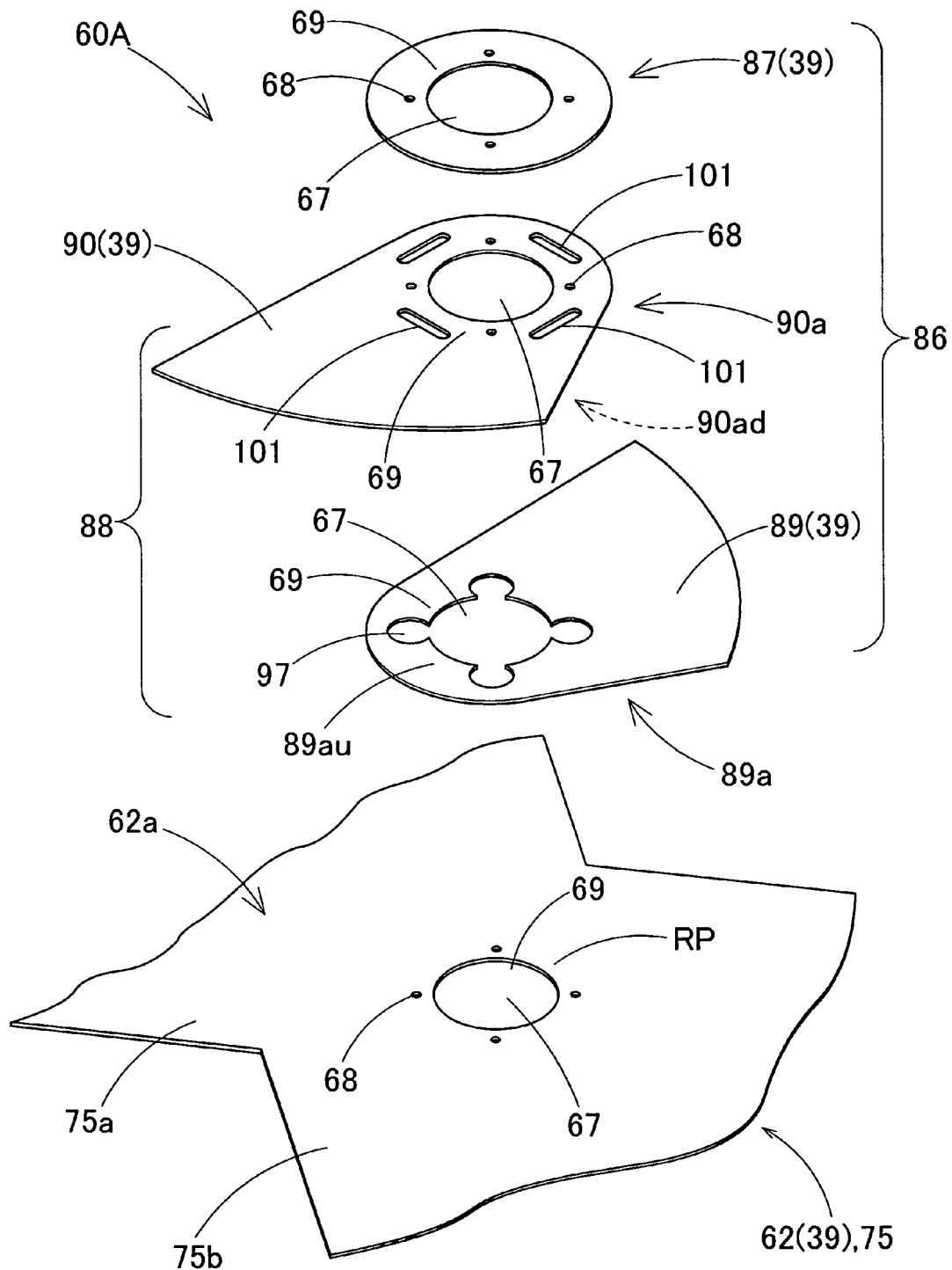
FIG. 19 is an exploded perspective view of a vicinity of a gas inlet port of a modification of the airbag of FIG. 9 with no indication of coating layers.
Figure 20:
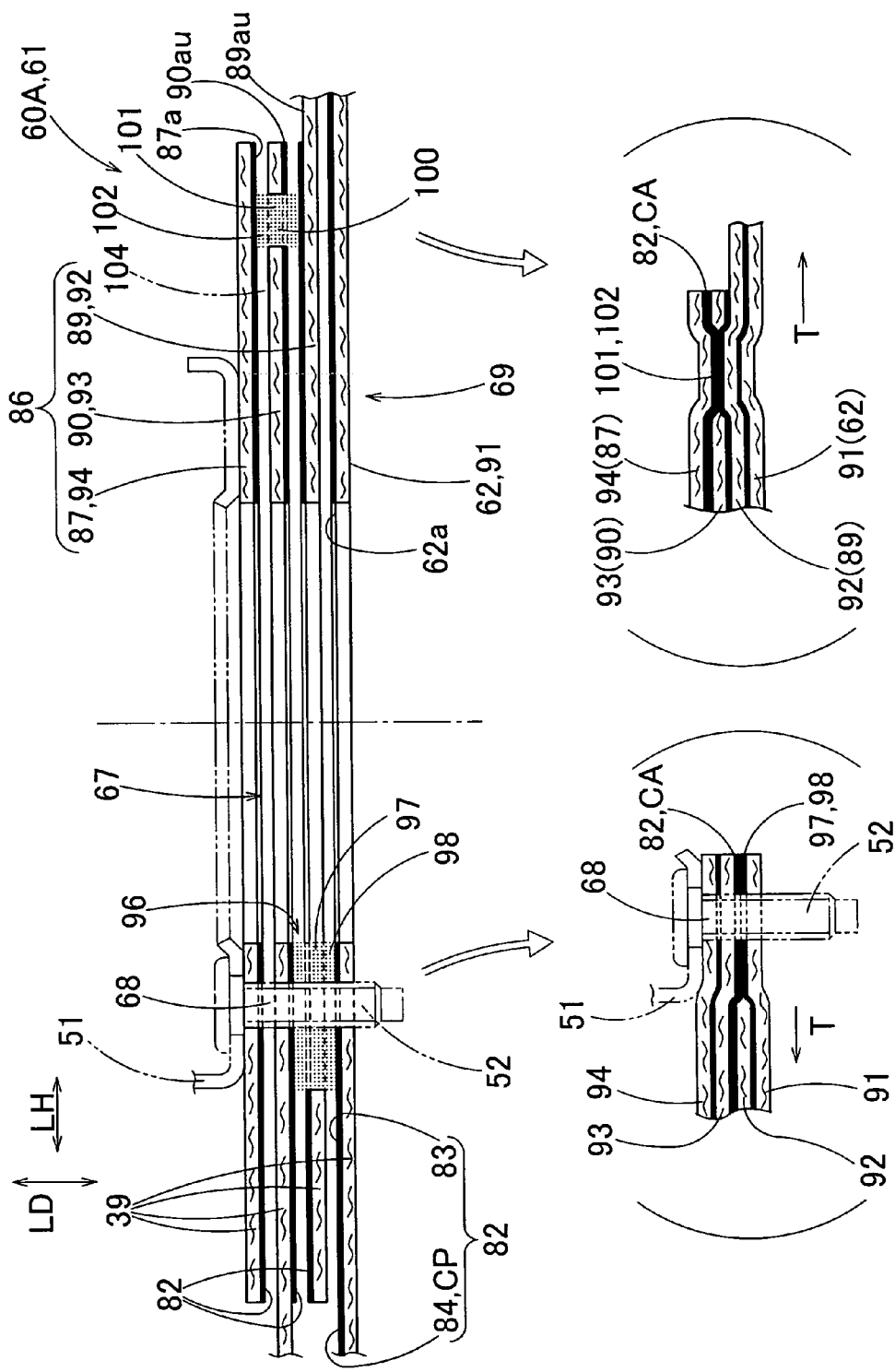
FIG. 20 is a vertical section of the vicinity of the gas inlet port of the airbag of FIG. 19 with indications of the coating layers and adhesion areas.

FIGS. 19 and 20 are illustrative of an airbag 60A, a modification of the second embodiment. The airbag 60A includes three sheets of supplementary cloths 86 (a reinforcing cloth 87 and cloth members 89 and 90) similar to those of the airbag 60, but the middle cloth 90 has only the mounting holes 68 and through holes 101 but no such through holes 97 that are formed around the mounting holes 68. The through holes 101, each having an oblong shape as those of the airbag 60, are in radial arrangement about the inlet port 67 of the airbag 60A in between each adjoining mounting holes 68. The cloth member 90 has the coating layer 82 on the underside 90ad of the peripheral region 90a. In the airbag 60A thus configured, the peripheral region 90a of the cloth member 90 is directly bonded to the bond area 83 of the body cloth 62 although the reinforcing cloth 87 is not directly bonded to the body cloth 62.

In the airbag 60A, as shown in FIG. 20, the component cloth 93 (cloth member 90) is bonded to the component cloth 91 (body cloth 62) by the adhesion areas 98 formed at the no-cloth areas 96 (i.e. at the through holes 97 formed on the cloth member 89), such that the component cloth 93 is prevented from slipping from the component cloth 91 in the direction LH orthogonal to the layering direction LD. Further, the component cloths 94 and 92 (the reinforcing cloth 87 and cloth member 89) are bonded together by the adhesion areas 102 formed at the no-cloth areas 100 (i.e. at the through holes 101 formed on the cloth member 90). In the component cloth 92, the adhesion areas 98 position the peripheries of the through holes 97 and thus preventing the component cloth 92 from slipping from the component cloth 91 in the direction LH orthogonal to the layering direction LD. The component cloth 94 is bonded to the component cloth 92 (cloth member 89) that is adhered to the component cloth 91 by the adhesion areas 98 without a fear of slippage, that is, the component cloth 94 is indirectly prevented from slipping from the component cloth 91 in the direction LH orthogonal to the layering direction LD, via the component cloth 92.

That is, all the supplementary cloths 86 (component cloths 92, 93 and 94) are bonded to the body cloth 62 (component cloth 91) without slippage in the direction LH orthogonal to the layering direction LD and bonded in close contact with one another. This configuration makes it easy to insert the bolts 52 of the retainer 51 into the mounting holes 68 of the body cloth 62 via the supplementary cloths 86, and thus improving handleability of the airbag 60A.

Although the fabric 39 of the foregoing embodiments has been described as woven by nylon 66, other polyamide yarns, by way of example aliphatic polyamide such as nylon 6, nylon 46 and nylon 12 other than nylon 66; aromatic polyamide such as aramid, may be used for weaving the fabric 39. Out of these, nylon 66 is preferable from the viewpoint of heat-resistance and versatility. The reasons are as follows:

Nylon 66 has a higher melting point (265° C.) than other general-purpose nylon; nylon 6 (225° C.), nylon 11 (187° C.) and nylon 12 (176° C.). Having an even higher melting point (290° C.), nylon 46 is peculiar and expensive. Although aromatic polyamide has high mechanical strength, it is inferior in abrasion resistance.

The polyamide yarn used to weave the fabric 39 is normally multiple wound yarn of 200 to 700 dtex though depending on types of polyamide. For example, nylon 66 multiple wound yarn consisting of 72 filaments, the fineness being 470 dtex is used. The type of weave of the fabric 39 may be twill weave or satin weave other than plain weave.

The cover factor (K) of the fabric 39, which is obtained by the following formula, is desirably 1200 to 2400.

$$K=NW \times DW^{0.5}+NF \times DF^{0.5}$$

where NW is the warp density (yarns/inch), DW is the warp fineness (denier), NF is the weft density (yarns/inch) and DF is the weft fineness (denier).

The low or high cover factor (K) relative to the above-mentioned value means that warp and weft densities and/or warp and weft finenesses are relatively low or high.

If the yarn density and/or fineness are/is low, it would be hard for the fabric 39 to obtain desired mechanical strength. If the yarn density is low, slippage is likely to occur and collapse the texture.

If the yarn density and/or fineness are/is high, the rigidity of the fabric 39 would hardly settle within a desired value. Furthermore, if the yarn density is high, the fabric 39 would become too thick, which may adversely affect the foldability and storability of the circumferential wall 11/61 of the airbag 10/60.

The coating layer 32/82 formed on one surface of the fabric 39 is required to be of polyamide elastomer that helps keep low gas permeability and is recyclable together with the fabric 39. In the foregoing embodiments, the coating layer 32/82 is formed as thin as possible from the viewpoint of flexibility, and has a macrostructure where the polyamide elastomer infiltrates into interstices of the texture of the surface of the fabric 39. The polyamide elastomer used to form the coating layer 32/82 desirably has following characteristics:

(1) Melting point: 135 to 200° C. Preferably 145 to 185° C., and further preferably 155 to 180° C.

The difference between the melting point of the polyamide yarn of the fabric 39 and that of the polyamide elastomer of the coating layer 32/82 should be 120° C. and below, preferably 90° C. and below, and further preferably 80° C. and below.

If the melting point is higher than the above range, the degree of crystallinity increases relative thereto, thus increasing the rigidity, i.e. reducing the flexibility, of the circumferential wall 11/61 of the airbag 10/60. This will make it difficult to fold up the airbag, and the desired unfurling performance will be hard to secure at airbag deployment. That is, too high melting point is likely to impair smooth unfurling of the airbag 10/60 when fed with inflation gas. Conversely, the melting point lower than the above range will make it difficult to secure the desired air tightness (air unpermeability) on the extended area 34/84, and further increases the difference of the melting points between the polyamide yarn of the fabric 39 and the polyamide elastomer of the coating layer 32/82, which will make the circumferential wall 11/61 of the airbag 10/60 unsuitable as recyclable material.

(2) Tensile elongation at rupture (ASTM D638): 200% and above. The tensile elongation at rupture lower than this range will impair the flexibility of the circumferential wall 11/61 of the airbag 10/60 and may cause cracks in the elastomer coating film by the stress at airbag deployment, which will deteriorate the air tightness.

(3) Flexural modulus (ASTM D790): 200 MPa and below. The flexural modulus higher than this range will impair the flexibility of the circumferential wall 11/61. Although the flexural modulus is desirably low, the lower limit thereof is normally 50 MPa.

(4) Water absorption, Equilibrium (ASTM D570; 20° C.×65% R): 3% and below, and preferably 2% and below. The water absorption higher than this range may allow the coating film to absorb moisture, which may cause peel-off of the coating film.

It is confirmed that the water absorption is advantageous in coating adhesion when it is equal to the water absorption, equilibrium (3.3 to 4.5%) of nylon 66 fiber of the polyamide yarn of the fabric 39 or slightly lower than that.

(5) Contains no environmental load substances such as residual formalin. It is desired that the polyamide elastomer for the coating layer 32/82 does not contain environmental load substances from the viewpoint of recycling.

The type of polyamide elastomer is not limited as long as it satisfies the above characteristics (1) and desirably (2) to (5), and can be selected from the types specified below. Among them, block copolymer type polyamide elastomer is preferable since it provides desired melting point (heat resistance) and flexibility (tensile elongation at rupture and flexural modulus).

(1) Block copolymer type: PEBA (polyether block polyamide) having polyamide (PA) blocks as hard segments and polyether (PE) blocks as soft segments, which is represented by the following structural formula, can be preferably used.

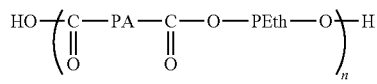

By way of example, polytetramethylene ether glycol, polypropylene glycol or the like can be used as the polyether. The soft segment may alternatively be formed of polyester block such as aliphatic polyester diol.

(2) Crystalline-reduced type: This is the type with reduced crystallinity obtained by subjecting chains of nylon molecules to graft polymerization with a functional group (for example, an alkoxyalkyl group) and separating distances between the molecules to reduce the intermolecular attractive force.

(3) Polymer alloy type: The polymer alloy type has a sea-island structure where rubber fine particles such as EPDM are dispersed in PA resin.

(4) Plasticizer type: The plasticizer type is a softened PA obtained by adding plasticizer. By way of example, butylbenzenesulfonamide, N-alkyltoluenesulfonamide, hexylene glycol and p-oxybenzoic acid ester-2 can be used as the plasticizer.

The polyamide (PA) elastomer described above is applied to the fabric 39 in the form of dispersion liquid (emulsion) or solution.

The particle diameter of the PA elastomer dispersed in the emulsion ranges normally 0.05 to 5 μm, preferably 0.2 to 5 μm, and more preferably 0.2 to 1 μm.

The mode of emulsification includes the following methods by way of example:

(1) Solvent substitution method: Dissolve a polymer in a solvent and then add an emulsifier and water thereto to carry out phase reversal (the solvent is collected).

(2) Pressure method: Agitate a polymer, an emulsifier and water in a vessel under high temperature and high pressure for emulsification.

(3) Machine emulsification method: Carry out emulsification by a mechanical shear force using a biaxial extruder.

When used in the form of solution, cyclohexanone, cresol or the like are used as solvent.

The method of applying the emulsion or solution of the polyamide can be arbitrarily selected from printing (such as transfer printing), dipping, knife coating (die coating), comma coating and reverse coating. In view of securing flexibility of the circumferential wall 11/61, what is preferable among these is the method that can easily form a thin coating film of elastomer on one surface of the fabric 39 by having the multiple would yarn impregnated with the PA by surface and making the PA infiltrate into interstices of the texture on one surface of the fabric 39.

The coating amount (based on dry weight) can be selected arbitrarily from the range of 10 to 100 $gm^{-2}$, preferably 10 to 25 $gm^{-2}$, and more preferably 10 to 20 $gm^{-2}$, considering the balance of the air permeability, flexibility (foldability) and adhesiveness required for the airbag.

After applying the polyamide elastomer, the fabric 39 is usually subjected to heat treatment in order to bond (fusion bond) the PA coating film to the fabric 39. At this time, the fabric 39 is desirably in such a condition that the PA coating film is in the state of surface impregnation relative to the multiple wound yarn and has not passed constricted parts (bottlenecks: minimum clearance part) of interstices of the texture that run through to the other surface. Thus the circumferential wall 11/61 maintains or secures flexibility. If the multiple wound yarn is impregnated further with the PA up to the interior thereof and/or if the PA has passed through the constricted parts of the interstices of the texture to form a coating film on the back surface as well, the circumferential wall 11/61 will acquire rigidity, and thereby impairing the flexibility.

The heat treatment is carried out at a temperature that is higher than the melting point of the polyamide forming the coating film by 5 to 30° C. (desirably 10 to 20° C.) and is lower than that of the polyamide forming the fabric 39 by 30° C. and above (desirably 50° C. and above) and for 0.5 to 10 minutes (desirably 0.5 to 5 minutes). If the difference between the treatment temperature and the melting point of the PA elastomer is small, fusion bonding will be difficult and the adhesiveness will not be sufficient. On the contrary, if the difference between the treatment temperature and the melting point of the PA elastomer is too large, the fusing fluidity of the PA elastomer will be increased, which will allow the PA elastomer to infiltrate into the interstices of the texture of the fabric 39 thoroughly. This will promote the heat deterioration of the fabric 39 as well as impair the flexibility of the circumferential wall 11/61. That is, if the treatment temperature is set way higher than the melting point of the PA elastomer, the temperature will hardly be lower than the melting point of the polyamide forming the fabric 39 by 30° C. and above (preferably 50° C. and above).

The extended area 34/84 of the body cloth 12/62 manufactured as described above has an air permeability (measured by a high pressure airflow-measuring device 20 KPa) of 1.5 $Lcm^{-2}\ min^{-1}$ and below, desirably 0.5 $Lcm^{-2}\ min^{-1}$ and below, further desirably 0.2 $Lcm^{-2}\ min^{-1}$ and below, and a Frazier air permeability (JIS L 1096-A method) of 0.01 $mLcm^{-2}s^{-1}$ and below, desirably 0.003 $mLcm^{-2}s^{-1}$.

The PA elastomer used in the foregoing embodiments is PEBA commercially available and having the following characteristics:

(1) Melting point (ASTM D3418): 160° C.

(2) Tensile elongation at rupture (ASTM D638): 450%

(3) Flexural modulus (ASTM D790 (ISO 178)): 84 MPa (4) Water absorption, Equilibrium (ASTMD570; 20° C.×65% R): 1.2%

The adhesive force between the coating layers 32/82 is desirably 200 to 600N, more desirably 200 to 300N when measured by Tensile shear adhesion test according to JIS K 6850. If the adhesive force is too low, the tensile strength of the reinforced area RP will not be sufficient, whereas too high adhesive force will increase the coating amount and weight of the coating composition CM, which is not preferable. In the event that the coating amount of the coating composition CM on the bond area 33/83 of the body cloth 12/62 is not enough to secure the desired adhesive force, the coating composition CM should be additionally applied to areas to be bonded.

Figure 22:
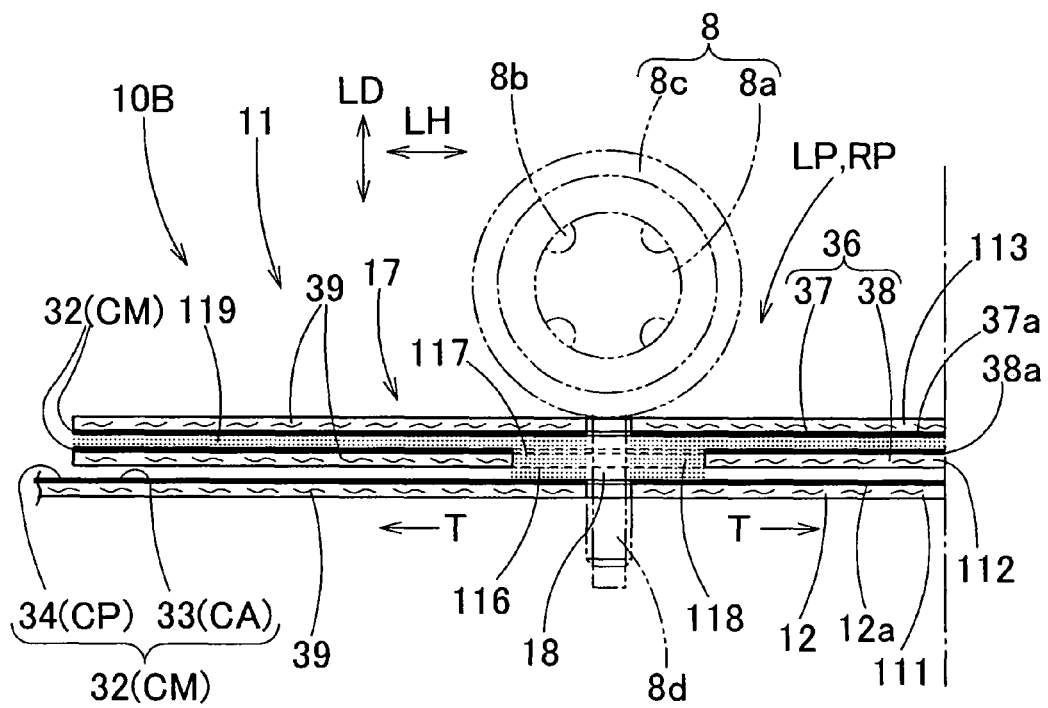
FIG. 22 is a vertical section of a vicinity of a mounting hole of another modification of the airbag of the first embodiment.
Figure 23:
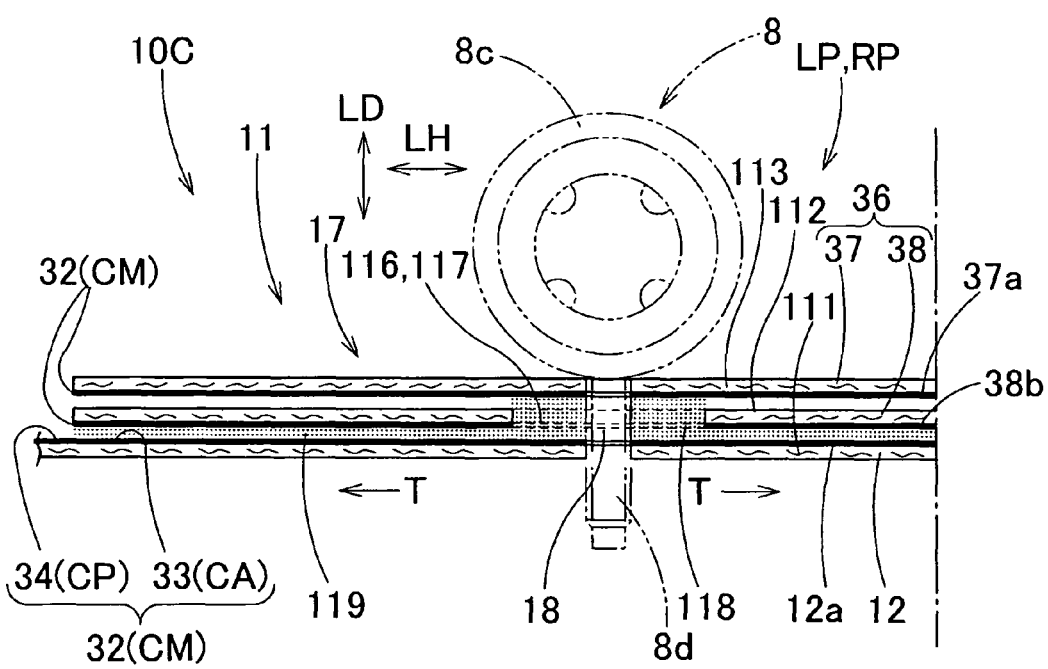
FIG. 23 is a vertical section of a vicinity of a mounting hole of yet another modification of the airbag of the first embodiment.

Although three sheets of supplementary cloths 86 are bonded to the body cloth 62 in the second embodiment, two sheets of supplementary cloths 36 each having a coating layer 32 on one surface may be bonded to the body cloth 12, as shown in FIGS. 22 and 23.

An airbag 10B shown in FIG. 22 is a further modification of the airbag 10A, which is a modification of the airbag 10 of the first embodiment. The airbag 10B includes a second reinforcing cloth 38 between the body cloth 12 and reinforcing cloth 37. The reinforcing cloth 38 is provided on the top surface 38a with a coating layer 32 for heat sealing with the coating layer 32 on the underside 37a of the reinforcing cloth 37. The reinforcing cloth 38 is made of the fabric 39, the same fabric forming the body cloth 12 and reinforcing cloth 37, and includes on the location of each of the mounting holes 18 and its periphery a round through hole 117.

The airbag 10B is manufactured according as the airbag 10, i.e., before forming the mounting holes 18, the reinforcing cloth 38 having the through holes 117 and having the coating layer 32 on the top side 38a, and then the reinforcing cloth 37 having the coating layer 32 on the underside 37a are placed on the inner surface 12a of the bond area 33 of the body cloth 12, and the cloths are subjected to heat sealing. After the cloths 37 and 38 are directly or indirectly adhered to the body cloth 12, the connecting portions 20, 21 and 23 are formed, and the body cloth 12 is doubled up and sewn up at the outer peripheral edge, thus completing the airbag 10B.

In the airbag 10B, the reinforcing cloth 37 (component cloth 113) and reinforcing cloth 38 (component cloth 112) adjoining each other are directly bonded together by an adhesion area 119 formed there between. The component cloth 112 (reinforcing cloth 38) placed between the body cloth 12 (component cloth 111) and component cloth 113 (reinforcing cloth 37) includes a no-cloth area 116 which is comprised of the through hole 117, and the component cloths 111 and 113 are bonded together by an adhesion area 118 formed at the no-cloth area 116. That is, the component cloth 113 is adhered to the component cloth 111 at the no-cloth area 116 by the adhesion area 118 whereas the component cloth 112 is indirectly bonded to the component cloth 111 via the component cloth 113 which is directly adhered to the component cloth 111. The adhesion area 118 positions the component cloth 112 by a peripheral area of the through hole 117.

Due to direct or indirect bonding to the body cloth 12 (component cloth 111) and positioning by the adhesion area 118, all the supplementary cloths 36 (component cloths 112 and 113) are bonded to the body cloth 12 (component cloth 111) without a fear of slippage in a direction LH orthogonal to the layering direction LD and bonded in close contact with one another. This configuration makes it easy to insert a bolt 8c of the retainer 8c into the mounting hole 18 of the body cloth 12 via the supplementary cloths 36 (reinforcing cloths 37 and 38), and thus improving handleability of the airbag 10B.

The coating layer 32 of the reinforcing cloth 38 may alternatively be formed on the underside 38b, as illustrated in FIG. 23. In an airbag 10C shown in FIG. 23, both reinforcing cloths 37 and 38 (component cloths 112 and 113) are directly adhered to the body cloth 12 (component cloth 111) by adhesion areas 118 and 119, so that all the supplementary cloths 36 (component cloths 112 and 113) are bonded to the body cloth 12 (component cloth 111) without slippage in a direction LH orthogonal to the layering direction LD and bonded in close contact with one another. This configuration also makes it easy to insert a bolt 8c of the retainer 8c into the mounting hole 18 of the body cloth 12 via the supplementary cloths 36 (reinforcing cloths 37 and 38), and thus improving handleability of the airbag 10C.

In the airbags 10B and 10C respectively illustrated in FIGS. 22 and 23, the no-cloth area 116 is comprised of the through hole (can also be referred to as an inner space) 117 formed on the component cloth 112. Alternatively, the no-cloth area may be comprised of an outer space that is located outside of a component cloth, as in airbags 10D and 10E illustrated in FIGS. 24 and 25.

Figure 24:
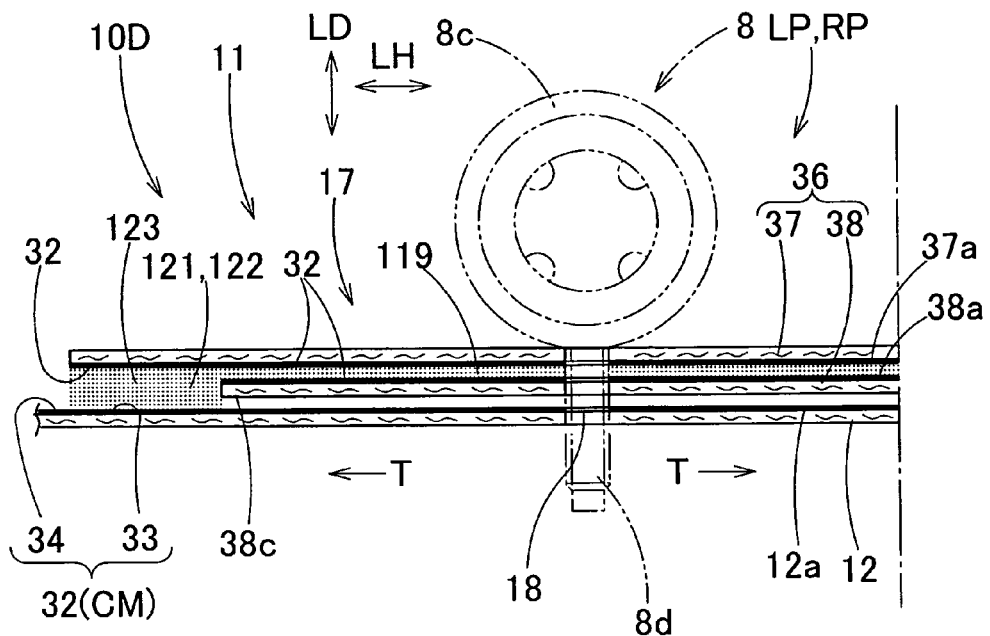
FIG. 24 is a vertical section of a vicinity of a mounting hole of still another modification of the airbag of the first embodiment.

Specifically, an airbag 10D shown in FIG. 24 has a similar structure to the airbag 10B except in that the reinforcing cloth 38 (component cloth 112) is slightly smaller in outer contour than that of the airbag 10B and does not include any through holes 117 as those of the airbag 10B.

In the airbag 10D, the reinforcing cloth 37 (component cloth 113) and reinforcing cloth 38 (component cloth 112) adjoining each other are directly bonded together by an adhesion area 119 formed there between. The component cloth 112 (reinforcing cloth 38) placed between the body cloth 12 (component cloth 111) and component cloth 113 (reinforcing cloth 37) includes a no-cloth area 121 that is comprised of an outer space 122 located outside of the component cloth 112, and the component cloths 111 and 113 are bonded together by an adhesion area 123 formed at the no-cloth area 121. That is, the component cloth 113 is adhered to the component cloth 111 at the no-cloth area 121 by the adhesion area 123 whereas the component cloth 112 is indirectly bonded to the component cloth 111 via the component cloth 113 which is directly adhered to the component cloth 111. The adhesion area 123 also positions the outer peripheral edge 38c of the component cloth 112.

In the airbag 10D as well, due to direct or indirect bonding to the body cloth 12 (component cloth 111) and positioning by the adhesion area 123, all the supplementary cloths 36 (component cloths 112 and 113) are bonded to the body cloth 12 (component cloth 111) without slippage in a direction LH orthogonal to the layering direction LD and bonded in close contact with one another. This configuration makes it easy to insert a bolt 8c of the retainer 8c into the mounting hole 18 of the body cloth 12 via the supplementary cloths 36 (reinforcing cloths 37 and 38), and thus improving handleability of the airbag 10D.

Figure 25:
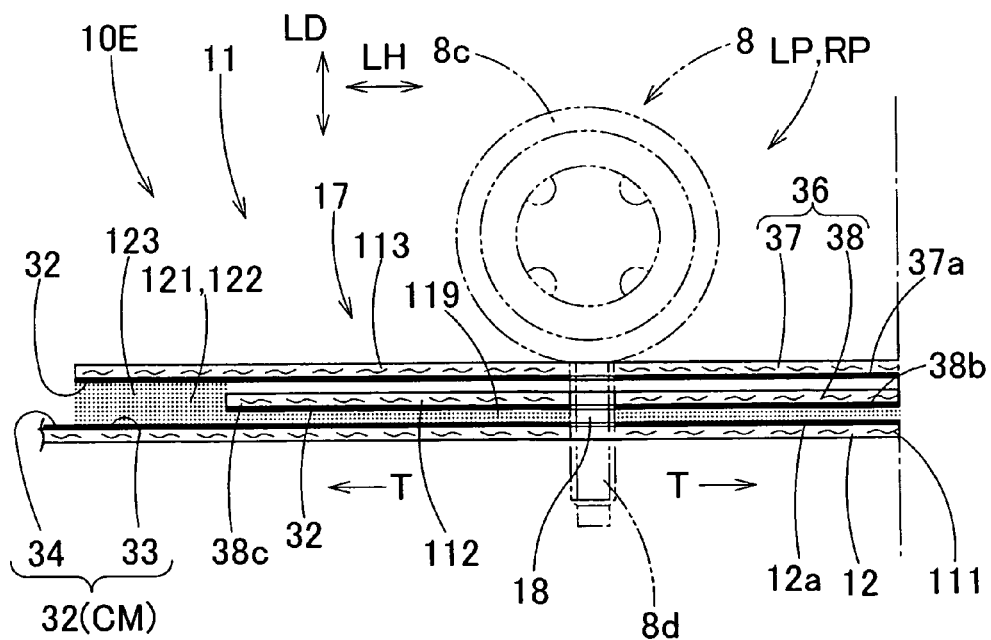
FIG. 25 is a vertical section of a vicinity of a mounting hole of still another modification of the airbag of the first embodiment.

The airbag 10E illustrated in FIG. 25 is similar in structure to the airbag 10D except in that the coating layer 32 of the reinforcing cloth 38 is formed on the underside 38b. In the airbag 10E, both reinforcing cloths 37 and 38 (component cloths 112 and 113) are directly adhered to the body cloth 12 (component cloth 111) by adhesion areas 119 and 123, so that all the supplementary cloths 36 (component cloths 112 and 113) are bonded to the body cloth 12 (component cloth 111) without slippage in a direction LH orthogonal to the layering direction LD and bonded in close contact with one another. This configuration also makes it easy to insert a bolt 8c of the retainer 8c into the mounting hole 18 of the body cloth 12 via the supplementary cloths 36 (reinforcing cloths 37 and 38), and thus improving handleability of the airbag 10E.

The configuration of utilizing such an outer space as described above for bonding supplementary cloths may be applied to an instance where three or more sheets of supplementary cloths are laminated on the body cloth. Referring to airbag 60B/60C illustrated in FIGS. 26 and 27, if a laminated structure is to be comprised of, for example, four sheets of supplementary cloths 91, 92, 93 and 94, the component cloth 91 (body cloth 62) located lowermost and the uppermost cloth 94 (reinforcing cloth 87) are so arranged that their coating layers 32 oppose each other. Intervening cloths 92 and 93 (cloth members 89 and 90) may be arbitrarily arranged with respect to the side on which the coating layer 32 is formed. By way of example, the coating layers 32 of the intervening cloths 92 and 93 are arranged face to face in the airbag 60B shown in FIG. 26 whereas those of the airbag 60C shown in FIG. 27 face away from each other. Further alternatively, the coating layers 32 may be formed on the same side of the component cloths 92 and 93 so as to face toward the same direction as in the airbag 60 shown in FIG. 18.

Figure 26:
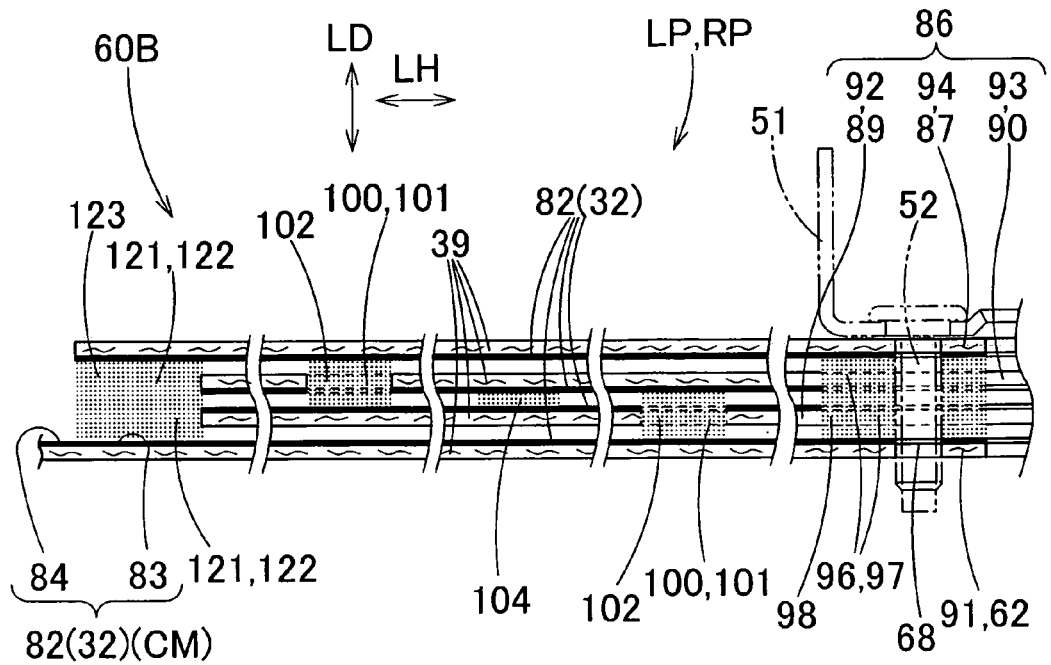
FIG. 26 is a vertical section of a vicinity of a mounting hole of another modification of the airbag of the second embodiment.
Figure 27:
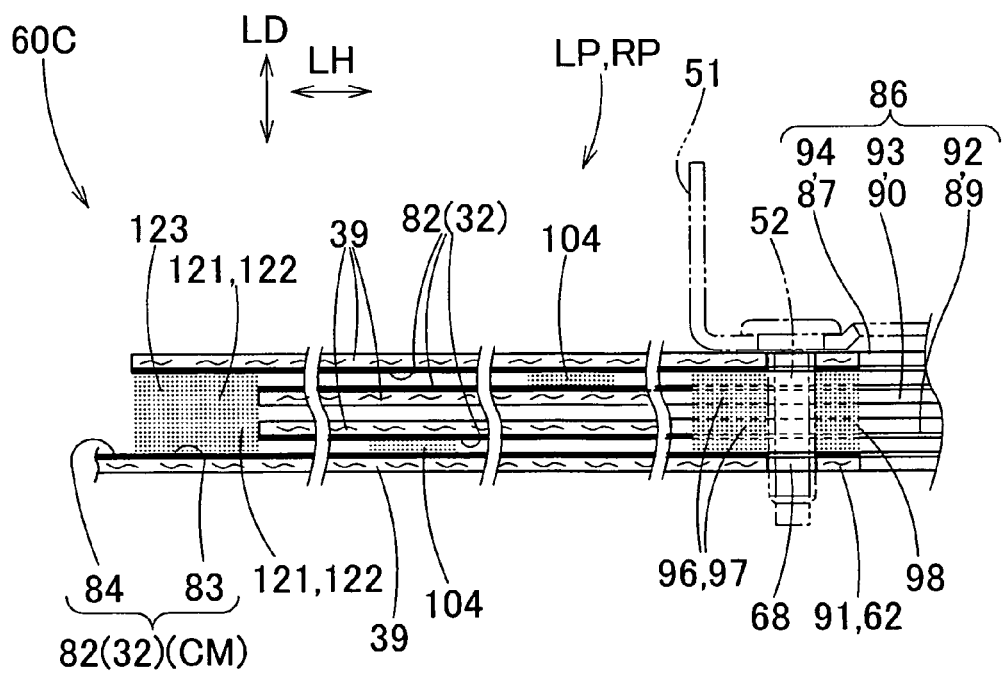
FIG. 27 is a vertical section of a vicinity of a mounting hole of yet another modification of the airbag of the second embodiment.

In this case, too, any suitable pair of components cloths can be bonded together. For example, FIGS. 26 and 27 illustrates the component cloths 91 and 94 that are bonded together by the adhesion areas 98 formed at the no-cloth area 96 (the inner space or through hole 97 of the cloths 92 and 93) or by the adhesion area 123 formed at the no-cloth area 121 (the outer space 122). FIG. 26 also illustrates the component cloths 92 and 94 that are bonded together by the adhesion area 102 formed at the no-cloth area 100 (the inner space or through hole 101 of the cloth 93) and the component cloths 91 and 93 that are bonded together by the adhesion area 102 formed at the no-cloth area 100 (the inner space or through hole 101 of the cloth 92).

In any of above cases the adhesion areas 98, 102, 104 and 123 bond all the component cloths 91, 92, 93 and 94 together in an inseparable manner and without a fear of slippage from one another in a direction LH orthogonal to the layering direction LD.

Although the airbag 10 of the first embodiment has been described as used for the side airbag apparatus S1 and the airbag 60 of the second embodiment has been described as used for the airbag apparatus S2 for a front passenger's seat, the present invention may be applied to various types of airbag used for, by way of example, airbag apparatuses for a driver's seat, knee protection and so on.

What is claimed is:

1. An airbag mountable on a vehicle comprising:
    a body cloth made of polyamide woven fabric and constituting a circumferential wall of the airbag for inflation into a bag shape when fed with inflation gas, the body cloth including on an inner surface thereof:
        a bond area having a coating layer of polyamide elastomer and more than one supplementary cloths directly or indirectly bonded to the body cloth on the bond area such that the bond area has a laminated structure, each of the supplementary cloths forming the laminated structure and being made of polyamide woven fabric bonded using the polyamide elastomer of the coating layer as heat sealable adhesive;

an extended area having a same coating layer of polyamide elastomer as on the bond area, the extended area being arranged in such a manner as to be exposed to inflation gas upon airbag inflation such that the coating layer acts as a protective membrane for preventing gas leakage; and an uncoated area that has no coating layer thereon, wherein:

the bond area includes an adhesion area between the component cloths that is formed of the coating layer as heat sealable adhesive and bonds a pair of the component cloths together, the adhesion area is formed between a pair of component cloths immediately adjoining each other or between a pair of component cloths that have at least one other component cloth interposed and at a part of the other component cloth where there is no cloth, and the base cloth and all the supplementary cloths are bonded together without slippage from one another in a direction orthogonal to a layering direction of the cloths.

2. The airbag according to claim 1, wherein each of the supplementary cloths includes on a side adhered to the body cloth a same coating layer of polyamide elastomer as formed on the body cloth.

3. The airbag according to claim 1, wherein:

the airbag includes a high-pressure chamber that is located upstream of inflation gas channel and a low-pressure chamber that is partially communicated with the high-pressure chamber and is kept at low pressure relative to the high-pressure chamber in the course of airbag inflation; and the extended area having the coating layer constitutes the high-pressure chamber.

4. The airbag according to claim 3, wherein:

the airbag is configured to be mounted on a lateral of a seat of the vehicle;

the airbag includes a pelvis protection area that restrains a pelvis section of a seated occupant and an upper protection area that is located above the pelvis protection area for restraining a region of the occupant above the pelvis section; and the high-pressure chamber constitutes the pelvis protection area and the low-pressure chamber constitutes the upper protection area.

5. The airbag according to claim 1, wherein the extended area having the coating layer is located on an area proximate a gas inlet port of the airbag which is to be subjected to mist of inflation gas.

6. The airbag according to claim 5, wherein:

the airbag is configured to be mounted in front of a front passenger's seat of the vehicle;

the airbag includes a redirecting cloth that is arranged to cover the gas inlet port and includes a front outlet that redirects incoming inflation gas forward and a rear outlet that redirects incoming inflation gas rearward; and the extended area having the coating layer is located in the vicinity of the front outlet and rear outlet of the redirecting cloth.

7. The airbag according to claim 6, wherein;

the body cloth includes a restraint panel arranged generally vertically facing toward the rear and a vehicle body side panel extending forward from an outer peripheral edge of the restraint panel in a generally square conical, narrowing fashion;

the vehicle body side panel as deployed includes an upper region which is a generally upper half circumferential region of the square cone and a lower region which is a generally lower half circumferential region of the square cone;

the gas inlet port is formed on a front area of the lower region such that the airbag is secured to an airbag housing at a peripheral area of the gas inlet port by being held down by a retainer housed in the airbag;

the redirecting cloth is formed into a tube extending in an anteroposterior direction, having a round opening shape and in which the front outlet has a greater opening area than the rear outlet;

the redirecting cloth is held down onto the airbag housing by the retainer together with the peripheral area of the gas inlet port;

in a vertical, anteroposterior sectional view of the airbag as secured to the airbag housing and fully inflated by itself, with respect to the height from a base line that extends along an opening plane of the gas inlet port, the height at an upper edge of the front outlet is greater than that at an upper edge of the rear outlet, and the upper edge of the rear outlet is located at the rear relative to a rear edge of a portion of the redirecting cloth held down by the retainer;

a region of the extended area in front of the front outlet extends upward on the upper region of the vehicle body side panel from a front edge of the redirecting cloth at the vicinity of a front periphery of the gas inlet port, up to or beyond an intersecting point of the upper region of the vehicle body side panel and a front perpendicular line that extends forward from the upper edge of the front outlet perpendicularly to a front vertical straight line that connects a point of the redirecting cloth immediately below a front end of the retainer and the upper edge of the front outlet; and a region of the extended area at the rear of the rear outlet extends rearward on the lower region of the vehicle body side panel from a rear edge of the redirecting cloth at the vicinity of a rear periphery of the gas inlet port, up to or beyond an intersecting point of the lower region of the vehicle body side panel and a rear perpendicular line that extends rearward from the upper edge of the rear outlet perpendicularly to a rear vertical straight line that connects a point of the redirecting cloth immediately below a rear end of the retainer and the upper edge of the rear outlet.

8. The airbag according to claim 1, wherein each of the supplementary cloths acts as a reinforcing cloth that improves heat resistance or tensile strength of the body cloth or as a redirecting cloth that redirects incoming inflation gas.

9. The airbag according to claim 1, wherein the bond area is located on an area surrounding mounting holes for receiving means for mounting the airbag to a predetermined location of the vehicle.

* * * * *